US006867787B1

(12) United States Patent
Shimizu et al.

(10) Patent No.: US 6,867,787 B1
(45) Date of Patent: Mar. 15, 2005

(54) CHARACTER GENERATOR AND CHARACTER GENERATING METHOD

(75) Inventors: Hideyuki Shimizu, Kanagawa (JP); Akira Honjo, Tokyo (JP); Yoshihiro Yoshioka, Kanagawa (JP); Tadayoshi Itani, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/524,251

(22) Filed: Mar. 13, 2000

(30) Foreign Application Priority Data

Mar. 15, 1999 (JP) .......................................... P11-069052

(51) Int. Cl.[7] .............................................. G09G 5/00
(52) U.S. Cl. ....................... 345/629; 345/470; 345/427; 345/441; 345/442; 345/468; 345/471; 345/467
(58) Field of Search ................................ 345/467, 679, 345/472, 629, 472.3, 419, 441, 676, 660, 619, 470, 427, 442, 468, 421, 426, 471

(56) References Cited

U.S. PATENT DOCUMENTS 5,463,729 A * 10/1995 Kitaguchi et al.
5,742,294 A * 4/1998 Watanabe et al.
6,057,858 A * 5/2000 Desrosiers ................... 345/467
6,100,895 A * 8/2000 Miura et al.

* cited by examiner

Primary Examiner—Kimbinh Nguyen
(74) Attorney, Agent, or Firm—Frommer Lawrence & Haug LLP; William S. Frommer; Dennis M. Smid

(57) ABSTRACT

A character generator and its method are suitably applied to such a video title generator for adding title images to a video program. Specifically, the character generator according to the present invention analyzes the form of characters inputted by an operator through a keyboard, and generates a polygon model matching the inputted characters so that the inputted characters look a three-dimensional image. The generated polygon model is subjected to rendering processing and displayed on a computer display. The polygon model displayed on the display can be changed in real time by using three-dimensional parameter and so on, for a shadow or perspective, which is set by the operator on the GUI screen. Thereby, the three-dimensional character generated by transforming the inputted character into the three-dimensional form can be generated with simple constructions and operations and in real time.

16 Claims, 25 Drawing Sheets

|  | Y:2 | Y:5 | Y:26 | Y:29 |
|---|---|---|---|---|
|  | From: 4, 5, 6 | From: 3, 7, 8 | From: 1, 2, 9 | From: 10 |
|  | To: 5 | To: 4, 6, 7 | To: 2, 3, 8 | To: 1, 9, 10 |
|  | Through: | Through: | Through: | Through: |

CHARACTER GENERATOR AND CHARACTER GENERATING METHOD

BACKGROUND OF THE INVENTION

1. Field of the Invention

This present invention relates to a character generator and a character generating method, and more particularly, is suitably applied to a device which automatically generates three-dimensional characters, such as a title generator for generating titles to be added to video programs, and a video editor for editing video data.

2. Description of the Related Art

In a video title generating apparatus for generating a video title to be overlapped on an image for display, when three-dimensionally displays the video title, shadows are attached to generated two-dimensional characters by special effect processing, so that the two-dimensional characters are apparently displayed in a three-dimensional form. Specifically, in the case where a three-dimensional video title is generated by special effect processing, computer graphics (CG) generating application composed of an algorithm called a three-dimensional modeling system is used.

This CG generating application has a high generalization. While it can create various kinds of three-dimensional images in addition to three-dimensional characters, it is complicated to operate. Therefore, it is difficult to satisfy the request of a user who wants to realize a simple and rapid editing operation, and as a result, the CG generating application has bad operability to generate video titles.

SUMMARY OF THE INVENTION

In view of the foregoing, an object of this invention is to provide a character generator and a character generating method which are capable of generating three-dimensional characters in response to input of characters in real time and have further improved operability to generate the three-dimensional characters as compared with conventional devices.

The foregoing object and other objects of the invention have been achieved by the provision of a character generator which analyses the form of a character inputted by an operator via a keyboard and generates a polygon model corresponding to the inputted character so as to three-dimensionally display the input character. The generated polygon model is subjected to rendering processing and displayed on a computer display. The polygon model being displayed on the display is transformed in real time by a three-dimensional parameter, such as a shadow or a perspective, which is set by an operator in a GUI screen. Therefore, the three-dimensional character can be generated from the inputted character in real time with a simple structure and operation.

Specifically, the character generator for generating a character signal comprises: a means for setting a parameter for transformation into a three-dimensional form; a means for inputting a plurality of characters by manipulating an input device; and a means for adding a three-dimensional image corresponding to the inputted characters, which is generated by using the set parameter, to the input characters so that the inputted characters look three-dimensional images.

Further, the character generator for generating a character signal comprises: a means for setting a parameter for transformation into a three-dimensional form; a means for inputting desired characters; a means for generating a polygon model corresponding to the inputted characters; and a means for performing rendering processing on the polygon model on the basis of the parameter for transformation into the three-dimensional form so that the inputted characters look images based on the parameter for transformation into the three-dimensional form.

Furthermore, the character generator comprises: a three-dimensionally generating means for transforming the form of a character designated by a user through input means, out of a plurality of characters provided to the user through the input means, into a three-dimensional form; and a display control means for displaying the character three-dimensionally generated by the three-dimensionally generating means on a display means in accordance with the designation of the character through the input means.

Furthermore, the character generator comprises: a three-dimensionally generating means for transforming the form of a character designated by a user through input means, into a three-dimensional form; a generating means for generating a three-dimensional character which is formed in the form of a polygon surface by fringing the character three-dimensionally generated by the three-dimensionally generating means; and a display control means for adding the three-dimensional character generated by the generating means to the character three-dimensionally generated by the three-dimensionally generating means and for display the resultant.

Furthermore, the character generator comprises: a three-dimensionally generating means for, when plural kinds of characters are designated through input means, respectively transforming the designated plural kinds of characters into three-dimensional forms within a virtual three-dimensional space area to generate three-dimensional characters; and a display control means for individually and independently projecting the three-dimensional characters on a display screen of display means.

In addition, the present invention provides a character generating method which comprises the steps of: setting a parameter for transformation into a three-dimensional form; inputting a plurality of characters by manipulating an input device; and adding a three-dimensional image corresponding to the inputted characters, which is generated by using the set parameter, to the input characters so that the inputted characters look three-dimensional images.

Further, the character generating method of generating a character signal comprises the steps of: setting a parameter for transformation into a three-dimensional form; inputting desired characters; generating a polygon model corresponding to the inputted characters; and performing rendering processing on the polygon model on the basis of the parameter for transformation into the three-dimensional form so that the inputted characters look images based on the parameter for transformation into the three-dimensional form.

Further, in the character generating method, the form of a character designated by a user through input means out of a plurality of characters which is provided to the user through the input means is transformed into a three-dimensional form, and the three-dimensionally generated character is displayed on display means in accordance with the designation of the character through the input means.

Further, in the character generating method, the form of a character designated by a user through input means is transformed into a three-dimensional form, a three-dimensional character formed of a polygon surface is formed by fringing the three-dimensionally generated character, and the three-dimensional character is added to the three-dimensionally generated character and displayed on display means.

Further, in the character generating method, when plural kinds of characters are designated through input means, the designated plural kinds of characters are respectively transformed into three-dimensional forms within a virtual three-dimensional space area to generate three-dimensional characters, and the three-dimensional characters are individually and independently projected on a display screen of display means.

In addition, the present invention provides an object generator for generating an object signal. The object generator comprises: a means for setting a parameter for transformation into a three-dimensional form; a means for inputting a plurality of objects by manipulating an input device; and a means for adding a three-dimensional image corresponding to the inputted objects, which is generated by using the set parameter, to the inputted objects so that the inputted objects look three-dimensional images.

Further, the object generator for generating an object signal, comprises: a means for setting a parameter for transformation into a three-dimensional form; a means for inputting desired objects; a means for generating a polygon model corresponding the inputted objets; a means for performing rendering processing on the polygon model based on the parameter for transformation into a three-dimensional form so that the inputted objects look images according to the parameter for transformation into a three-dimensional form.

In addition, the present invention provides an object generating method for generating an object signal. The object generating method comprises the steps of: setting a parameter for transformation into a three-dimensional form; inputting a plurality of objects by manipulating an input device; and adding a three-dimensional image corresponding to the inputted objects, which is generated by using the set parameter, to the inputted objects so that the inputted objects look three-dimensional images.

Further, the object generating method for generating an object signal, comprises the steps of: inputting desired objects; generating a polygon model corresponding the inputted objets; and performing rendering processing on the polygon model based on the parameter for transformation into a three-dimensional form so that the inputted objects look images according to the parameter for transformation into a three-dimensional form.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Configuration of Video Title Generating Apparatus

Figure 1:
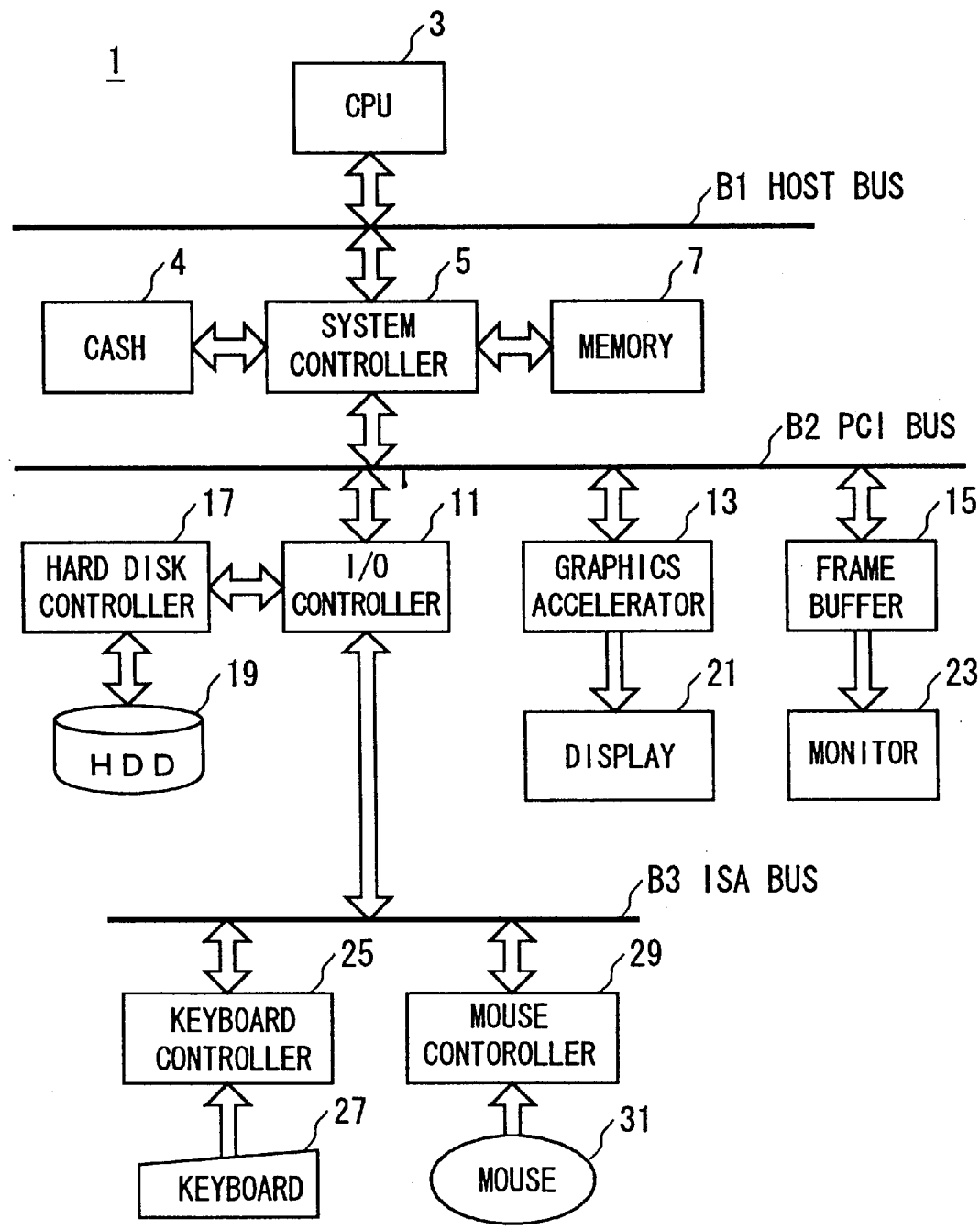
FIG. 1 is a block diagram showing one embodiment of a video title generating apparatus according to the present invention.

In FIG. 1, reference numeral 1 generally designates a video title generating apparatus and is adapted to form a video title in accordance with the operation of a user and to superpose the video title on an image for display. A central processing unit (CPU) 3 serves to control the whole video title generating apparatus 1 and to perform prescribed calculations, and can access a memory 7 and a cash 9 through a system controller 5 connected thereto with a host bus B1.

The CPU 3 accesses the memory 7 composed of, for instance, a dynamic random memory (DRAM) through the system controller 5 to write and store data in the memory 7 and to read the stored data from the memory 7. The cash 9 serves to store data which the CPU 3 frequently reads, out of the data stored in the memory 7. Accordingly, the CPU 3 stores the data which is read once from the data stored in the memory 7, in the cash 9, and when reading the same data again, the CPU 3 accesses the cash 9 to get the data.

Further, the CPU 3 is connected to a peripheral component interconnect (PCI) bus B2 through the system controller 5 and can access an input/output (I/O) controller 11, a graphics accelerator 13 and a frame buffer 15 which are connected to the PCI bus B2. The I/O controller 11 is connected to the PCI bus B2 and an industry standard architecture (ISA) bus B3 and is adapted to control the transmission and reception of data through the PCI bus B2 an the ISA bus B3. A hard disk controller 17 is connected to the I/O controller 11 and serves to read and write data to/from a prescribed area of a hard disk drive (HDD) 19 serving as a program data storing means, on the basis of an access request which is supplied from the CPU 3 through the I/O controller 11. The HDD 19 contains an incorporated hard disc to store an operating system (OS) and a software resource composed of an application program for generating a video title.

The graphics accelerator 13 draws and displays an image based on the operating system or the application program or the like, on a display 21 serving as a display means in response to an image drawing command which is supplied from the CPU 3 through the system controller 5. The frame buffer 15 is adapted to display a video signal supplied from an external video supply means, on a monitor 23 serving as a synthesis and display means in response to a display command which is supplied through the system controller 5 from the CPU 3.

A keyboard controller 25 informs the CPU 3 of input information inputted from a keyboard 27 serving as an input means in accordance with the input operation of the user, through the I/O controller 11 and the system controller 5 and further, transmits the input information to the graphics accelerator 13 through the I/O controller 11 to display an image based on the input information on the display 21.

When a mouse 31 serving as an input means is moved by the user, a mouse controller 29 informs the CPU 3 of moving information including the moving direction or the distance of the mouse 31, through the I/O controller 11 and the system controller 5, and moves a mouse cursor on the display 21 under the control of the CPU 3 in accordance with the movement of the mouse 31.

Figure 2:
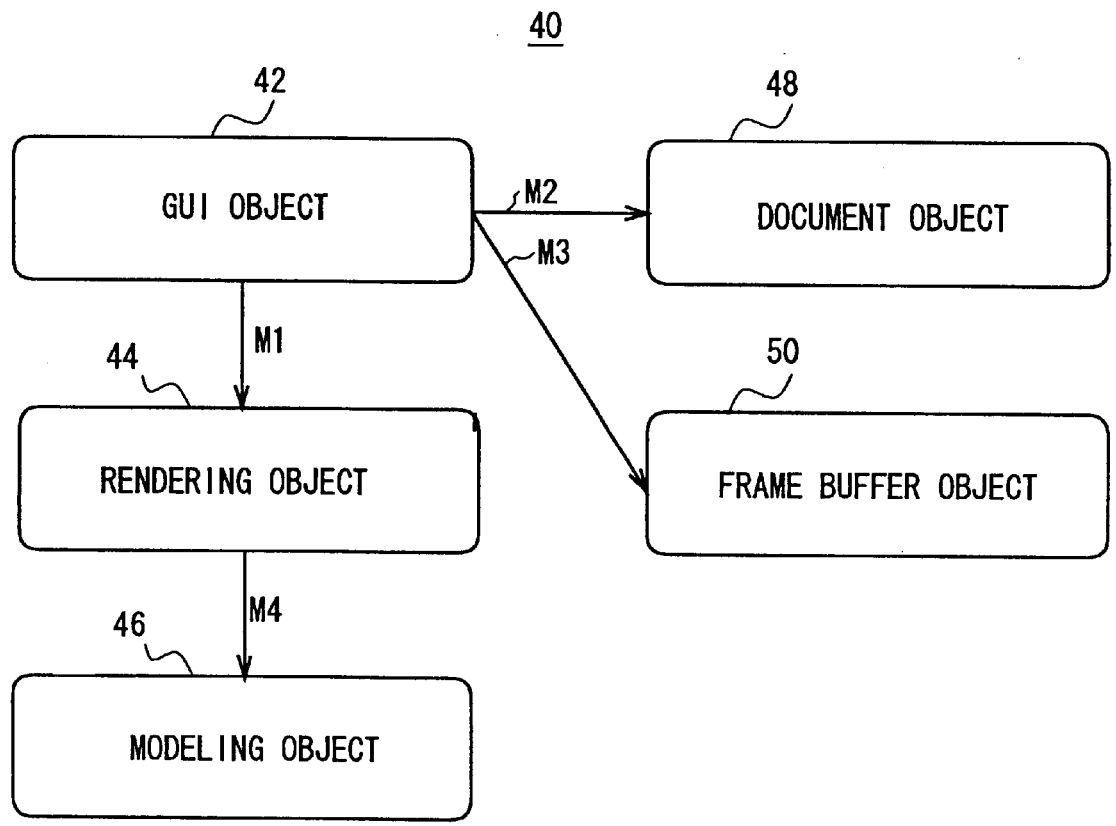
FIG. 2 is a schematic diagram explaining the configuration of an application program.

Incidentally, as shown in FIG. 2, an application program 40 stored in the HDD 19 is written by an object directive program language and is specifically composed of elements of a graphical user interface (GUI) object 42, a rendering object 44, a modeling object 46, a document object 48 and a frame buffer object 50.

The GUI object 42 serves to define all operations which are carried out by the user, to store various kinds of parameters designated by the respective operations and display and update them on the display 21 in accordance with the respective operations. Further, the GUI object 42 is a user interface relative to respective objects, and generates message information M1 for operating the rendering object 44, message information M2 for operating the document object 48 and message information M3 for operating the frame buffer object 50 in accordance with the respective operations, and informs the objects of these corresponding message information.

When receiving the message information M1 from the GUI object 42, the rendering object 44 serving as a display control means receives parameter information composed of parameters required for drawing an image from the document object 48 and performs image drawing processing on the display 21 on the basis of the parameter information. The modeling object 46 serving as a three-dimensional means generates a three-dimensional character composed of polygonal faces (referred to as a polygon, hereinafter) on the basis of character data designated via the keyboard 27 (FIG. 1). The rendering object 44 decides whether or not the user has carried out an operation for updating a display in the GUI object 42. As a result, when the object 44 decides that the user has carried out the operation for updating the display, the object 44 generates message information M4 for starting the modeling object 46 and supplies the message information M4 to the modeling object 46 to start the modeling object 46.

The document object 48 serving as a storage control means holds operations and a variety of parameters defined in the GUI object 42. Data required for creating shape data, position data, attitude data, color data, illumination data, moving data, scale data or the like concerning the three-dimensional character to be displayed on the display 21 is supplied as message information M2 from the GUI object 42 and used whenever an image drawing processing is updated by the rendering object 44. The frame buffer object 50 serving as a synthesis and display control means drives the frame buffer 15 (FIG. 1) to perform an image drawing processing on the monitor 23 (FIG. 1), on the basis of the message information M3 which is supplied from the GUI object 42 as well as the image drawing processing in the rendering object 44.

Figure 3:
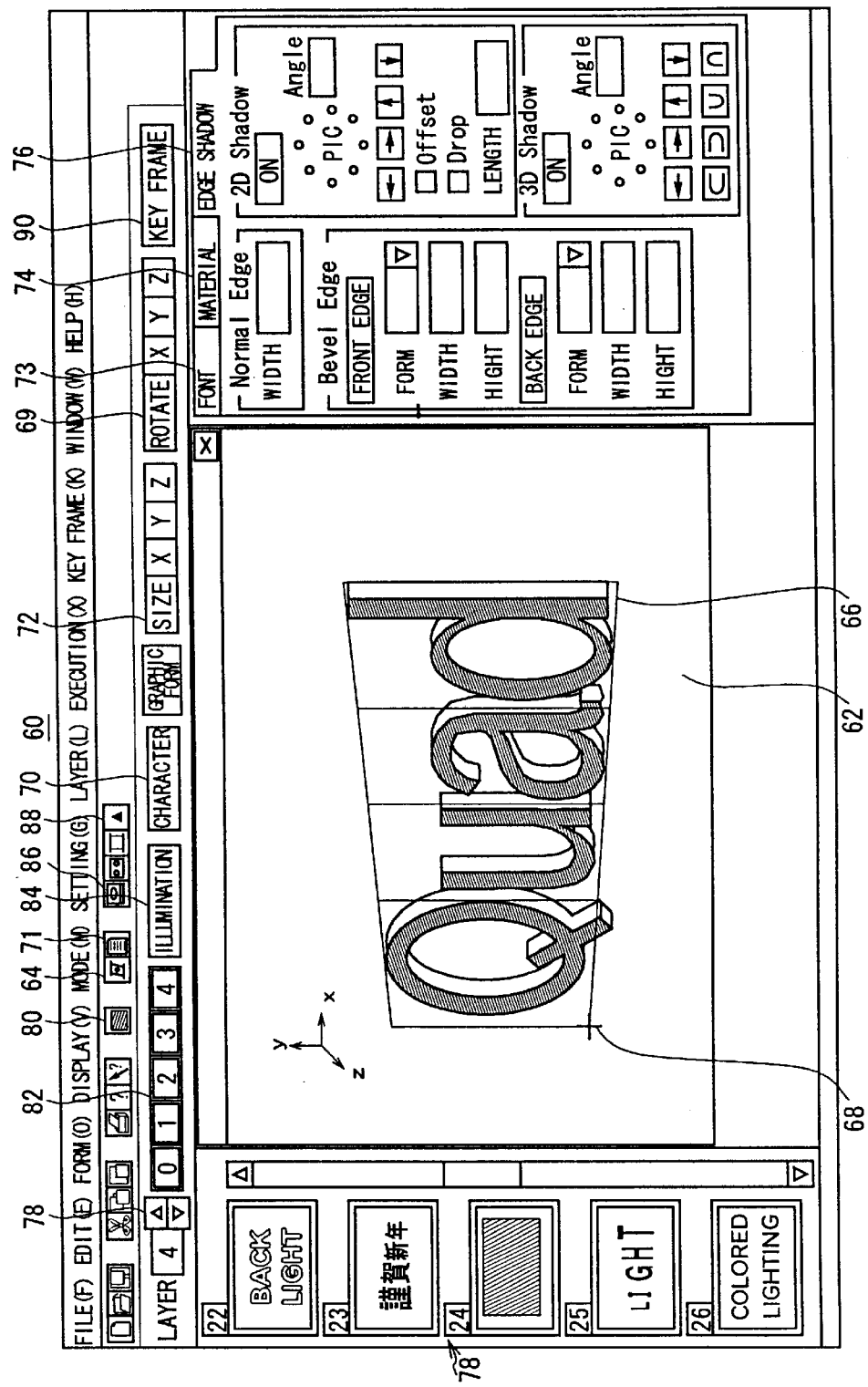
FIG. 3 is a schematic diagram explaining a GUI screen.

FIG. 3 shows a GUI screen 60 for executing the above described application program 40 and is displayed on the display 21 (FIG. 1). An operation for inputting, arranging and displaying characters in a virtual three-dimensional space area displayed on the scene window 62 of the GUI screen 60 will be first described among operations carried out on the GUI screen 60. When a new group generating button 64 is clicked by the user in the GUI screen 60, a group in which a plurality of characters are regarded as one set is newly generated. In this connection, all characters have such data structures to belong to any one group, and one or more characters can belong to one group.

Incidentally, in the GUI screen 60, when a character is inputted through the keyboard 27 (FIG. 1), a three-dimensional character corresponding to the inputted character instantaneously on the scene window 62. Note that, in the GUI screen 60, When the back space key of the keyboard 27 (FIG. 1) is pressed by the user, the inputted three-dimensional character can be deleted.

Further, in the GUI screen 60, when the user moves the cursor on the scene window 62 by using the cursor key of the keyboard 27 and then, presses the back space key of the keyboard 27 (FIG. 1), a desired character under the cursor can be deleted. Similarly, in the GUI screen 60, when the user moves the cursor by using the cursor key and then, inputs a character through the keyboard 27, a desired character can be inserted in a position indicated by the cursor. Such an image drawing processing and an image redrawing processing on the scene window 62 does not take time for the rendering processing of the rendering object 44, so that a desired image can be instantaneously displayed on the scene window 62.

Next, an operation for moving the display positions of characters inputted to the scene window 62 in parallel will be described below. In the GUI screen 60, when an area containing a desired group is double clicked by the user, a group containing characters whose display positions are changed is selected. After that, in the GUI screen 60, a selection frame 66 is displayed around the selected group to inform the user of what the characters in the selection frame 66 are selected.

Subsequently, in the GUI screen 60, when the user set a mouse cursor on the selected group and moves it while pressing (referred it to as a drag operation, hereinafter), the characters can be moved in parallel vertically (Y-axis direction) and horizontally (X-axis direction) in the virtual three-dimensional space area. Further, in the GUI 60, when the user performs the drag operation at the position of the rotation center axis 68 of the group, the characters can be moved in parallel in the direction of depth (Z-axis direction) in the virtual three-dimensional space area. Such an operation can be rapidly and accurately performed because the movement result can be displayed in real time on the scene window 62 without waiting the rendering processing of the rendering object 44.

Next, an operation for changing the display positions of the characters inputted to the scene window 62 by a rotating movement will be described below. In the GUI screen 60, when the user double clicks a desired group, a group concluding characters whose display positions are to be changed is selected. Then, in the GUI screen 60, the selection frame 66 is displayed around all the characters concluded in the selected group to inform the user of what the displayed group is selected. Under this state, in the GUI screen 60, when the user clicks a rotation axis switch 69, any one of the X-axis, the Y-axis and the Z-axis is selected as a coordinate axis to be used as a central axis for a rotational moving operation.

After that, in the GUI screen 60, by the drag operation of the user, the rotating movement can be performed in the virtual three-dimensional space area. In such a rotational movement operation, as well as the above described parallel movement operation, a changed result is displayed on the scene window 62 in real time without waiting the rendering processing, so that a desired moving operation can be rapidly and precisely carried out.

Further, in the GUI screen 60, when the user switches an image drawing mode switch 70, the image drawing of characters or graphic forms can be switched. Further, in the GUI screen 60, when the user selects a group property setting button 71, a prescribed screen is displayed so that a detailed setting operation concerning the group can be performed.

Now, an operation for modifying characters by changing various kinds of attributes of the characters among operations performed for the GUI screen 60 will be described hereinbelow. At first, an operation for changing the display size of a character will be described. In the GUI screen 60, when the user double clicks a desired group, the group concluding characters whose size is to be changed is selected.

Thus, in the GUI screen 60, the selection frame 66 is displayed around all the characters belonging to the selected group to inform the user of what the characters are currently selected. Further, in the GUI screen 60, when the user presses a size changing switch 72, any one of the X-axis, the Y-axis, and Z-axis is selected as a direction to which a size changing operation is applied.

Then, in the GUI screen 60, when the user performs a drag operation on the selected group, expand or contract the size of the character is enlarged or reduced to a desired size. Since a changed result is displayed in real time on the scene window 62 in an operation for changing the size, a desired operation can be rapidly and precisely carried out.

Next, an operation for changing the display font (face) of a character. In the GUI screen 60, when the user double clicks a desired group, a group containing characters whose fonts are to be changed is selected. After that, in the GUI screen 60, the selection frame 66 is displayed around all the characters belonging to the selected group to inform the user of the currently selected characters. Then, in the GUI screen 60, when the user clicks a font setting menu 73, a menu concerning the setting of font is displayed, then, a desired font can be selected from the plurality of fonts displayed to change a display font. The changed result can be rapidly displayed on the scene window 62.

Further subsequently, an operation for changing a material attribute concerning the material or texture of the surface of a character will be described below. In the GUI screen 60, when the user double clicks a desired group, a group concluding characters whose materials are to be changed is selected. In the GUI screen 60, the selection frame 66 is displayed around all the characters contained in the selected group to inform the user of the currently selected characters. Then, in the GUI screen 60, when the user selects a material setting menu 74, a menu for material setting is displayed. In the displayed menu, the user inputs the respective setting values of the material attributes such as the reflectivity of environmental diffused light, the reflectivity of specula light, emitted light, gloss, etc., to change the material attributes for the group. The material attributes are adjusted in this way so that the color or the degree of gloss of the surface of a character can be arbitrarily set by the user and the changed material attributes can be quickly displayed on the scene window 62.

Further subsequently, an operation for trimming, namely, applying an edge to a character will be described. In the GUI screen, when the user double clicks a desired group, a group containing characters with their edges to be added thereto is selected. After that, in the GUI screen 60, the selection frame 66 is displayed around all the characters contained in the selected group to inform the user of the currently selected characters. Then, in the GUI screen 60, when the user selects an edge shadow setting menu 76, a menu for setting edges is displayed.

In the display menu of the GUI screen 60, when the respective setting values of edge attributes such as the thickness of an edge, an edge color, a gradation switch and edge types are inputted, edge attributes are designated for the group. The edge types include a normal edge with a plane edge added to the periphery of a character, a bevel edge with a chamfered stereoscopic or three-dimensional edge added to the periphery of a character and an edge-off with no edge added. The edge attributes designated as described above are quickly displayed on the scene window 62.

Now, an operation for controlling pages and layers among operations carried out for the GUI screen 60 will be described. At first, an operation for pages will be described below. Here, the page indicates a concept adopted for simultaneously controlling a plurality of edited results and the contents of edit for one image plane displayed on the scene window 62 is held as one page. In the GUI screen 60, a page selector 78 and a new page adding button 80 are provided in order to uniformly control a plurality of pages. The page selector 78 is designed to completely display the list of pages currently held by a program and select a desired page from the list of the pages.

Further, in the GUI screen 60, when the user selects the new page adding button 80, a initial state page having no characters is newly and additionally formed and displayed on the scene window 62. At that time, in the GUI screen 60, a header image (called it a thumbnail image hereinafter) obtained by reducing the newly formed image which is displayed on the scene window 62 is displayed on the page selector 78. In the added new page, a desired editing operation is performed by the above described character input operation.

The user can perform an editing operation only on a page displayed on the scene window 62 (called it a current page, hereinafter). In the GUI screen 60, when the user clicks the thumbnail image showing a desired page out of the page list displayed on the page selector 78, the current page is selected and displayed on the scene window 62. The change of such a current page is rapidly reflected on the scene window 62.

Next, an operation on layers will be described below. Here, layers indicate a concept adopted for the purpose of improving efficiency of an editing operation by gathering or classifying, and processing a plurality of groups. The page has a plurality of layers, and one page is formed by laminating the respective layers together. In the GUI screen 60, one page is composed of five layers. Layer numbers of 0 to 4 (integer values) are respectively given to the layers for identification. Thus, each group formed in the page necessarily belongs to any one of the five layers.

The GUI screen 60 is designed to designate one layer (called it a current layer, hereinafter) to be edited among the five layers through a current layer selector 81. When the user designates the current layer by inputting a desired layer number to the current layer selector 81. Then, in the GUI screen 60, the editing operation such as the input of characters or the change of arrangement can be performed only on the designated current layer. In this connection, each group is formed so as to belong to the layer corresponding to the layer number designated upon formation of the group. Further, in the GUI screen 60, the display and non-display of the five layers can be individually designated by turning on and off five buttons arranged in a layer switch part 82 by the input operation of the user. The changed result is rapidly reflected on the scene window 62.

Further subsequently, an operation for changing the setting of illumination will be described. Here, the illumination is a virtual light source designed so as to show a behavior similar to that of the illumination in an actual world and exists in the virtual three-dimensional space area displayed in the scene window 62, however, it is not actually displayed on the scene window 62. In the GUI screen 60, when the user adjusts the setting value of the illumination, the appearance of characters arranged in the virtual three-dimensional space area can be arbitrarily designated.

In the GUI screen 60, when the user clicks an illumination setting button 84, an illumination dialogue is displayed to perform an illumination setting in the illumination dialogue. Under this state, when the user inputs the respective setting values of illumination or lighting conditions, for instance, an environmental light, a diffusive reflected light, a specular reflected light, and an illumination position in the GUI screen 60, the illumination conditions for the page is changed. In this connection, the GUI screen 60 is designed to set the same illumination relative to all the characters drawn on the same page. Therefore, different illuminations are not set relative to individual characters.

Finally, an operation for transmitting a still image or a motion image out of operations carried out relative to the GUI screen 60 will be described. Here, transmitting operation means an operation that page data edited on the scene window 62 is written in the frame buffer 15 (FIG. 1) and an image corresponding to the page data is displayed on the monitor 23. An operation for transmitting the page data as the still image will be first described. In the GUI screen 60, when the user selects a desired page from the page selector 78, an image corresponding to the selected page is selected on the scene window 62 to set the page to be transmitted to a current page. Under this state, when the user selects a still transmitting button 86 in the GUI screen 60, the current page is transmitted.

Next, an operation for transmitting the motion image of the current page will be described below. When the user selects a desired page from the page selector 78 in the GUI screen 60, an image corresponding to the selected page is displayed on the scene window 62 to set a page to be transmitted to the current page.

Under this state, when the user selects an animation transmitting button 88 in the GUI screen 60, a transmitting processing of a current page is performed. In this case, if the current page does not have the data (called it key frame data, hereinafter) concerning the motion image, the animation transmitting button 88 does not function. In this connection, when the user clicks a key frame addition button 90 in the GUI screen 60, a prescribed screen is displayed and the key frame data is formed.

Now, a procedure for generating a three-dimensional character (called it a polygon model, hereinafter) composed of a plurality of polygons by the CPU 3 will be described by employing a flowchart shown in FIG. 4. At step SP2 entering at step SP1, the CPU 3 holds the setting value of a material of the polygon model, the setting value of a light source and the setting value of a perspective for determining the appearance or viewpoint of an image in the scene window 62 in the document object 48 (FIG. 2) of the application program 40 in accordance with the input operation of the user. Values designated by the user are used as the setting values. However, if the user does not designate any setting values, previously prepared default values are employed.

At step SP3, the CPU 3 decides whether or not a desired key is inputted by the user through the keyboard 27. As a result, when the CPU 3 decides that the key has been inputted, the CPU 3 transmits key input information to the GUI object 42 (FIG. 2). On the other hand, when the CPU 3 decides that the key has not been inputted, the CPU 3 waits for the input of the key. At step SP4, the CPU 3 makes the GUI object 42 (FIG. 2) analyze the key input information to convert the key input information into a character code, stores the character code information in the document object 48 (FIG. 2) and supplies an instruction to generate the polygon model to the modeling object 46.

At step SP5, the CPU 3 generates the polygon model by employing the modeling object 46 on the basis of the character code information held in the document object 48. A specific method for generating the polygon model will be described by referring to FIG. 5. The modeling object 46 generates outline data D1 corresponding to the character code information held in the document object 48 on the basis of a currently set font form.

Next, the modeling object 46 generates a face polygon model D3 corresponding to the face part of the polygon model on the basis of the outline data D1. Subsequently, the modeling object 46 forms an edge polygon model D5 corresponding to the edge part of the polygon model on the basis of the parameter of a currently set edge. Further subsequently, the modeling object 46 forms a shadow model D7 corresponding to the shadow part of the polygon model on the basis of the parameter of a currently set shadow. In such a way, the modeling object 46 forms a polygon model D9 on the basis of the three polygon models formed relative to one character.

Returning to FIG. 4, at step SP6, the CPU 3 sets a material to each polygon of the polygon model D9 held by the modeling object 46 on the basis of each parameter of the material held by the document object 48 by using the GUI object 42. At step SP7, the CPU 3 uses the GUI object 42 to make the rendering object 44 set a perspective on the basis of each parameter of the perspective held in the document object 48.

Figure 6:
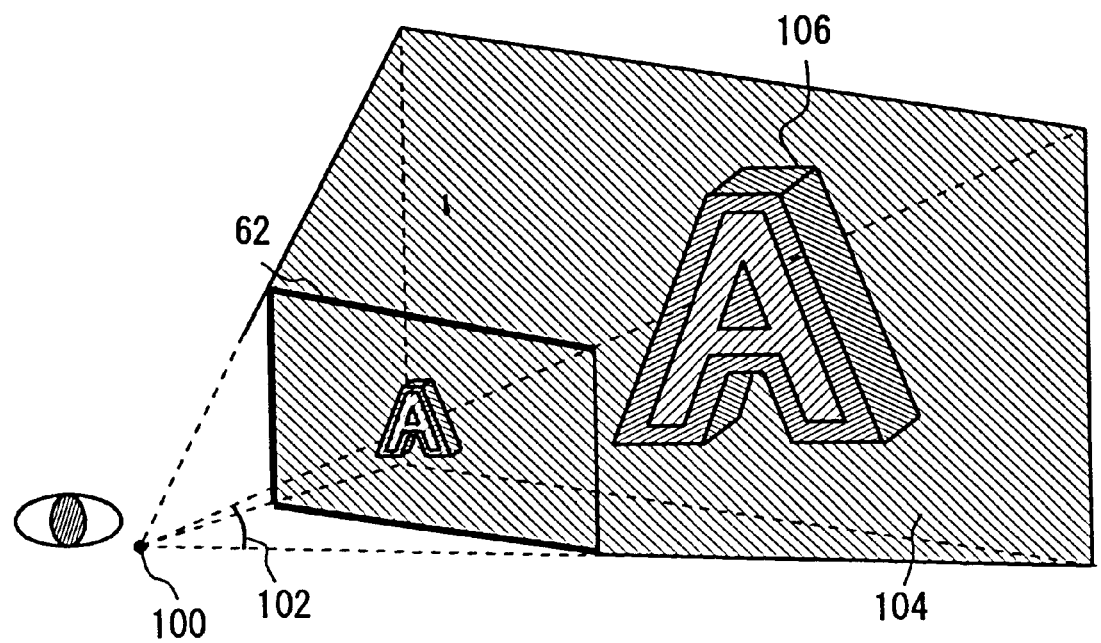
FIG. 6 is a schematic diagram explaining a perspective setting.

As specifically shown in FIG. 6 in which parts corresponding to those shown in FIG. 3 are indicated by the same reference numerals, perspective setting means designation of the form and direction of a visible volume 104 (area shown by oblique lines in the figure) corresponding to a viewpoint 100 and an angle of visibility 102. This visible volume decides how a polygon model 106 is projected on the scene window 62 (FIG. 3) of the GUI screen 60 or which polygon model 106 of a plurality of polygon models 106 is projected on the scene window 62, so that the polygon model 106 located in the visible volume is displayed on the scene window 62.

Now returning to FIG. 4, at step SP8, the CPU 3 sets an illumination to the rendering object 44 on the basis of the parameters of a light source held in the document object 48 by employing the GUI object 42. At step SP9, the CPU 3 uses the rendering object 44 to draw the image of the polygon model on the scene window 62 on the basis of the respective parameters.

In this manner, the CPU 3 can display the key inputted through the keyboard 27, on the display 21 as a three-dimensional character. Further, in order to display a plurality of three-dimensional characters, the CPU 3 returns to the step SP2 and repeats the similar processing so that it can display a video title on the display 21 in accordance with the input operation of the user.

According to the above described configuration, the CPU 3 obtains the outline data showing the outline of the character based on the character designated through the keyboard 27 with the operating system and the application program stored in the HDD 19, generates the face data surrounded by the outline of the character, the edge data for emphasizing the outline of the character and the shadow data for showing the depth of the character, on the basis of the outline data, synthesizes the face data, the edge data and the shadow data to form three-dimensional character data corresponding to an image to be edited which is externally supplied and displays an image corresponding to the formed three-dimensional character data on the display 21 in accordance with the designation of the character through the keyboard 27.

According to the above described configuration, the face data, the edge data and the shadow data are generated on the basis of the outline data of the character designated through the keyboard 27 by the user, these data are synthesized to form a three-dimensional character and the formed three-dimensional character is displayed on the display 21 in accordance with the designation of the character through the keyboard 27. Thus, the three-dimensional character can be formed more rapidly only by a more simple operation in which the user simply designates the character through the keyboard 27, as compared with a conventional case in which a general purpose CG generating application program is employed to form a three-dimensional character. Accordingly, a video title generating apparatus capable of improving operability as compared with a conventional apparatus can be realized.

(2) Procedure for Forming Polygon Model

Figure 4:
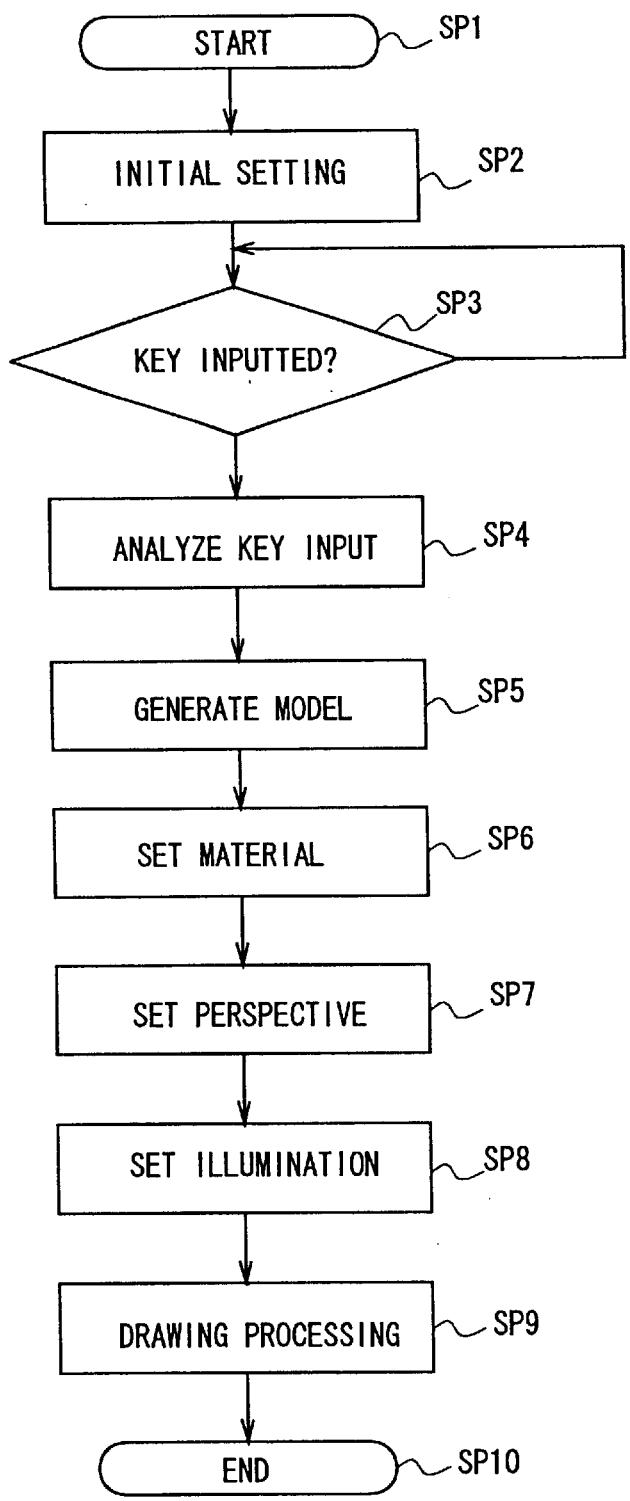
FIG. 4 is a flowchart showing a procedure for generating a polygon model by a CPU.

Now, the polygon model generating step (SP5) shown in FIG. 4 will be specifically described. At first, a three-dimensional character generating procedure for generating a three-dimensional character by the CPU 3 will be described. At step SP16 entering at step SP15, the CPU 3 first reads out font data composed of the combination of straight lines and curves from the operating system stored in the HDD 19 (FIG. 1), on the basis of the character code information in accordance with the input operation of the user. In this connection, the font data is composed of the set of closed loops and the number of loops is different depending on characters. In the loops forming the character, a completely painted out space and a blank space are alternately repeated successively from an outer loop to an inner loop.

At step SP17, the CPU 3 designates a curvature to the data of a curve part of character data corresponding to the read font data and calculates the coordinate data of a straight line, so that the character data is treated as vertex data. The curve treated here is defined by the following expression and divided into arbitrary points.

$$\left. \begin{array}{l} X(t) = \\ (xA - 2xB + xC) \cdot t^2 + (2xB - 2xA) \cdot t + xA \\ Y(t) = \\ (yA - 2yB + yC) \cdot t^2 + (2yB - 2yA) \cdot t + yA \end{array} \right\} \quad (1)$$

In this case, $0.0 \leq t \leq 1.0$.

Here, the points A and C indicate points on the curve, and the point B indicates a control point for dividing the curve.

Subsequently, at step SP18, the CPU 3 calculates a normal vector in each of the above described vertex data. The CPU 3 moves to step SP19 to simultaneously hold each vertex data and the normal vector as the font data. At step SP20, the CPU 3 makes a triangular division table for generating a polygon which is called a line segment arrangement table for a scan line on the basis of the calculated vertex data.

Figures 8A, 8B:
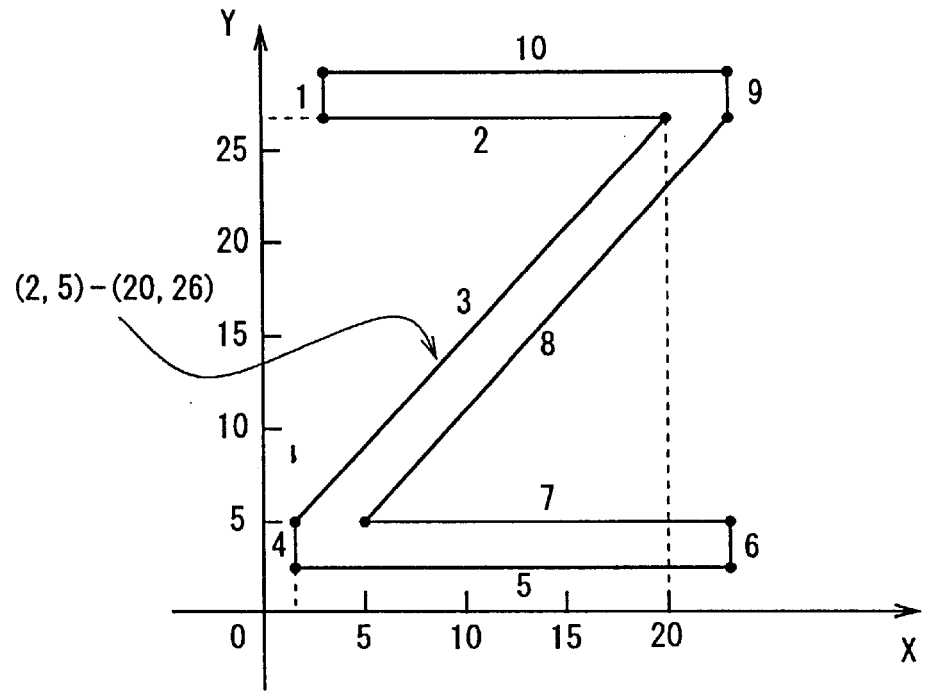
FIGS. 8A and 8B are schematic diagrams explaining the creation of a line segment arrangement table for a scan line.

Now, a method for making the line segment arrangement table for a scan line will be specifically described by referring to FIGS. 8A and 8B. FIG. 8A shows that line segment numbers are attached to line segments between all vertexes in a character "Z". FIG. 8B shows a line segment arrangement table for a scan line in which the numeric values on the Y coordinate concerning the respective vertexes are located are regarded as indexes. In the line segment arrangement table for a scan line, with an arbitrary Y coordinate as a reference, line segment data whose Y coordinate directed to a +Y direction is a start point is regarded as From data and line segment data whose Y coordinate directed to the +Y direction is an end point is regarded as To data and line segment data passing through the Y coordinate is regarded as Through data. In this line segment arrangement table for a scan line, for example, the line segment data of Y=5 is paid attention to. In this case, the line segment data (3, 7, 8) are registered as the From data, the line segment data (4, 6, 8) are registered as the To data and relevant line segment data does not exist as Through data.

Returning to FIG. 7, at step SP 21, the CPU 3 applies a triangular division processing for generating a polygon to the character data by employing the formed line segment-arrangement table for a scan line to create a face surface polygon. The CPU 3 notices a desired line segment out of the line segments obtained by connecting the respective vertexes together, to decide whether or not the noticed line segment can become a division line for dividing the polygon. In other words, the CPU 3 decides whether or not the noticed line segment intersects all other line segments. As a result, when the CPU 3 decides that the noticed line segment does not intersect other line segments, further the CPU 3 decides whether or not this line segment passes through the polygon. As a consequence, when the CPU 3 decides that the line segment passes through the polygon, it decides that this line segment is a division line for a triangular division. The CPU 3 performs similar processing relative to all the line segments to make the list of the division lines for the triangular division.

Figure 9:
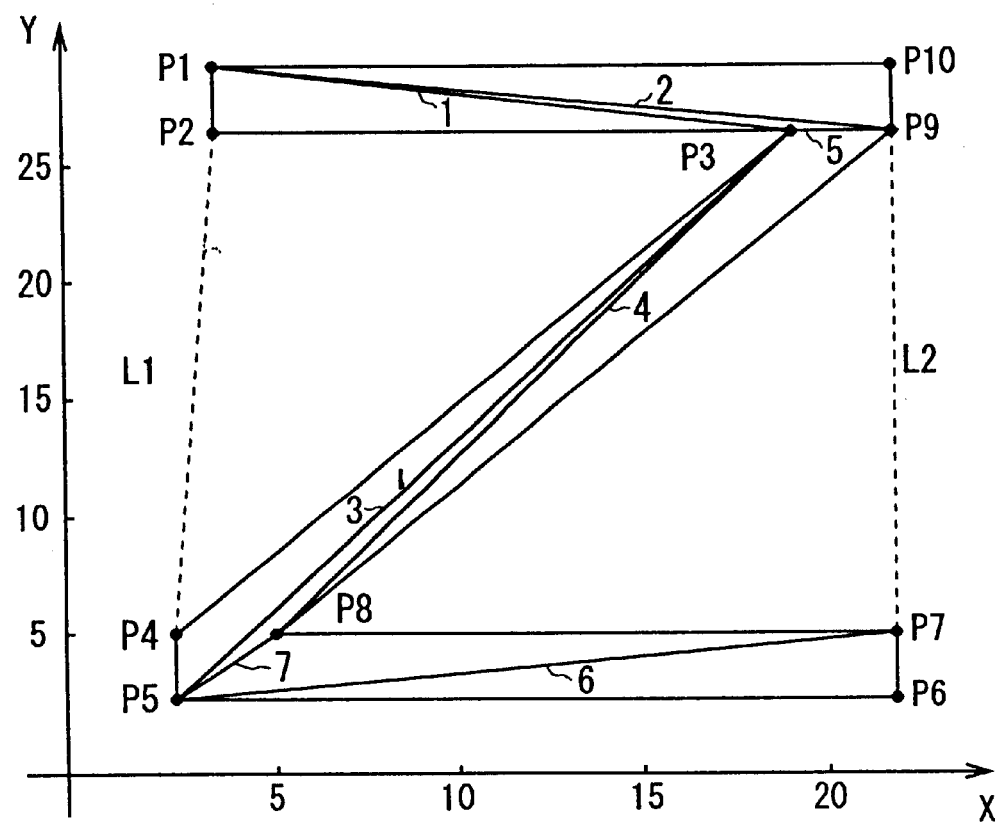
FIG. 9 is a schematic diagram explaining triangular division processing for generating the polygon.

For instance, referring to FIG. 9, a decision of whether or not a line segment L1 directed to a vertex P4 from a vertex P2 becomes a division line will be described. The CPU 3 first-pays attention to the line segment data of Y=5 and arranges the line segment data (3, 8) corresponding to the From data in regular order from a coordinate X of the smallest value. At that time, the line segment data registered in both the To data and the From data is excluded. Then, the CPU 3 decides whether or not the X coordinate value of the vertex P4 is the X coordinate value of the line segment data (3) or larger and the X coordinate value of the line segment data (8) or smaller. As a consequence, the CPU 3 decides that the X coordinate value of the vertex P4 is located within the above described range, and then, notices the line segment data of Y=26. The CPU 3 arranges the line segment (3, 8) corresponding to the To data in regular order from a coordinate X of the smallest value. At that time, the line segment registered in both the To data and the From data is excluded. Then, the CPU 3 decides whether or not the X coordinate value of the vertex P2 is the X coordinate value of the line segment data (3) or larger and the X coordinate value of the line segment data (8) or smaller. As a consequence, the CPU 3 decides that the X coordinate value of the vertex P2 is not located within the above described range and this line segment L1 does not pass through the polygon.

Returning to FIG. 7, at step SP 22, the CPU 3 decides which side of two spaces sandwiching a noticed line segment in a closed loop therebetween is to be a polygon, by employing the line segment arrangement table for a scan line to decide the face part of a character, so that it specifies the normal vector of a polygon in a depth direction, namely, the front face direction of a face depth polygon. Then, at step SP23, the CPU 3 forms polygons having depth of desired length for all the vertex data and adds the normal vector specified at the step SP22, to each vertex to form the face depth polygon. At step SP24, the CPU 3 employs a value obtained by subtracting the length of depth from all the vertex data as the Z coordinate value of a back surface polygon to form a face back surface polygon having the normal vector of −Z direction.

Figure 10:
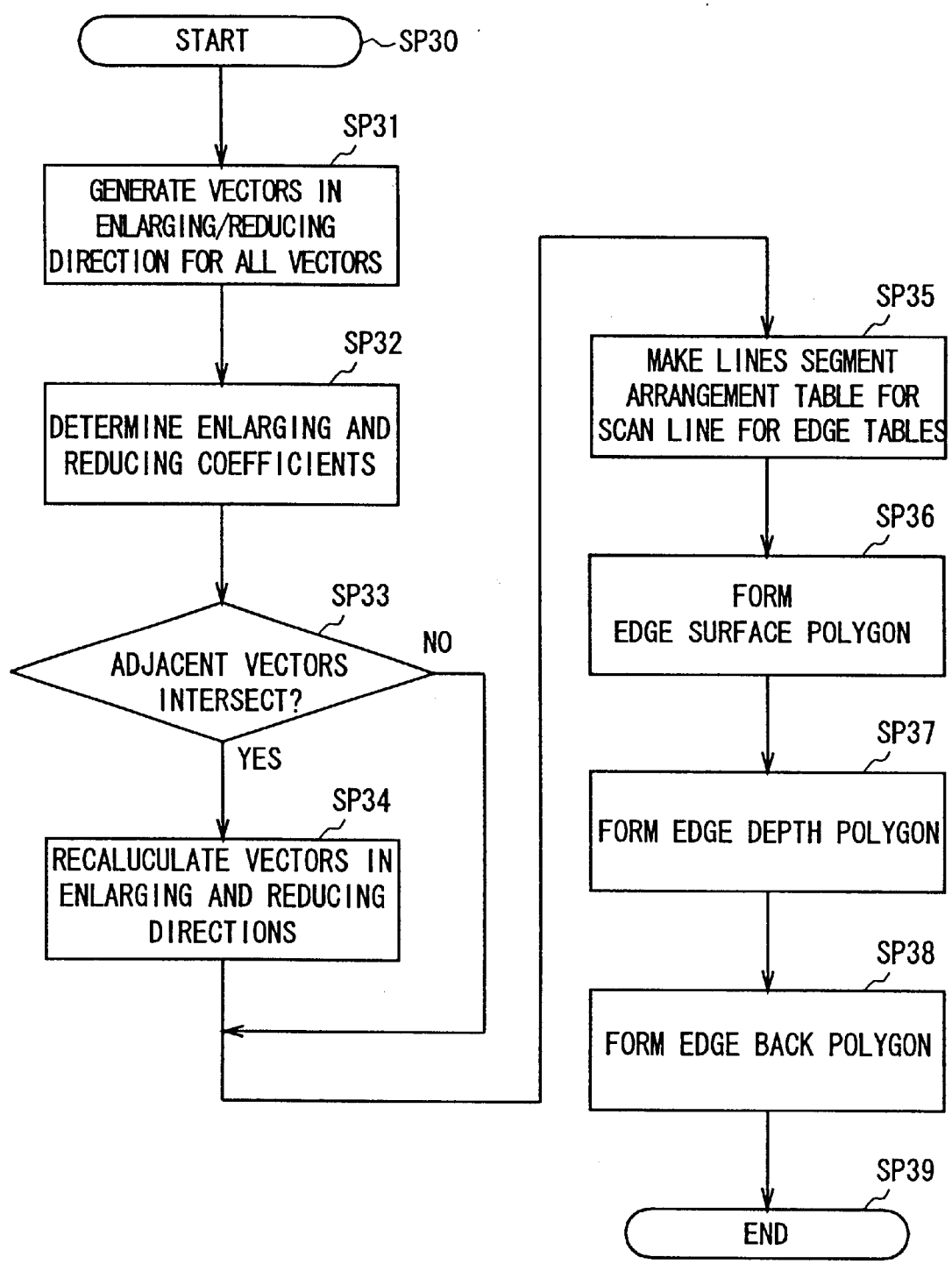
FIG. 10 is a flowchart showing a procedure for generating edges.

Subsequently, a procedure for generating an edge model for emphasizing the outline of a character which is applied to the face polygon model generated in accordance with the above described procedure by referring to a flowchart shown in FIG. 10. At step SP31 entering at step SP30, the CPU 3 serving as a three-dimensional element generating means forms and holds unit vectors in an enlarging direction or a reducing direction by using the coordinate values and the normal vectors of respective vertexes forming the outline of the character.

Figure 11:
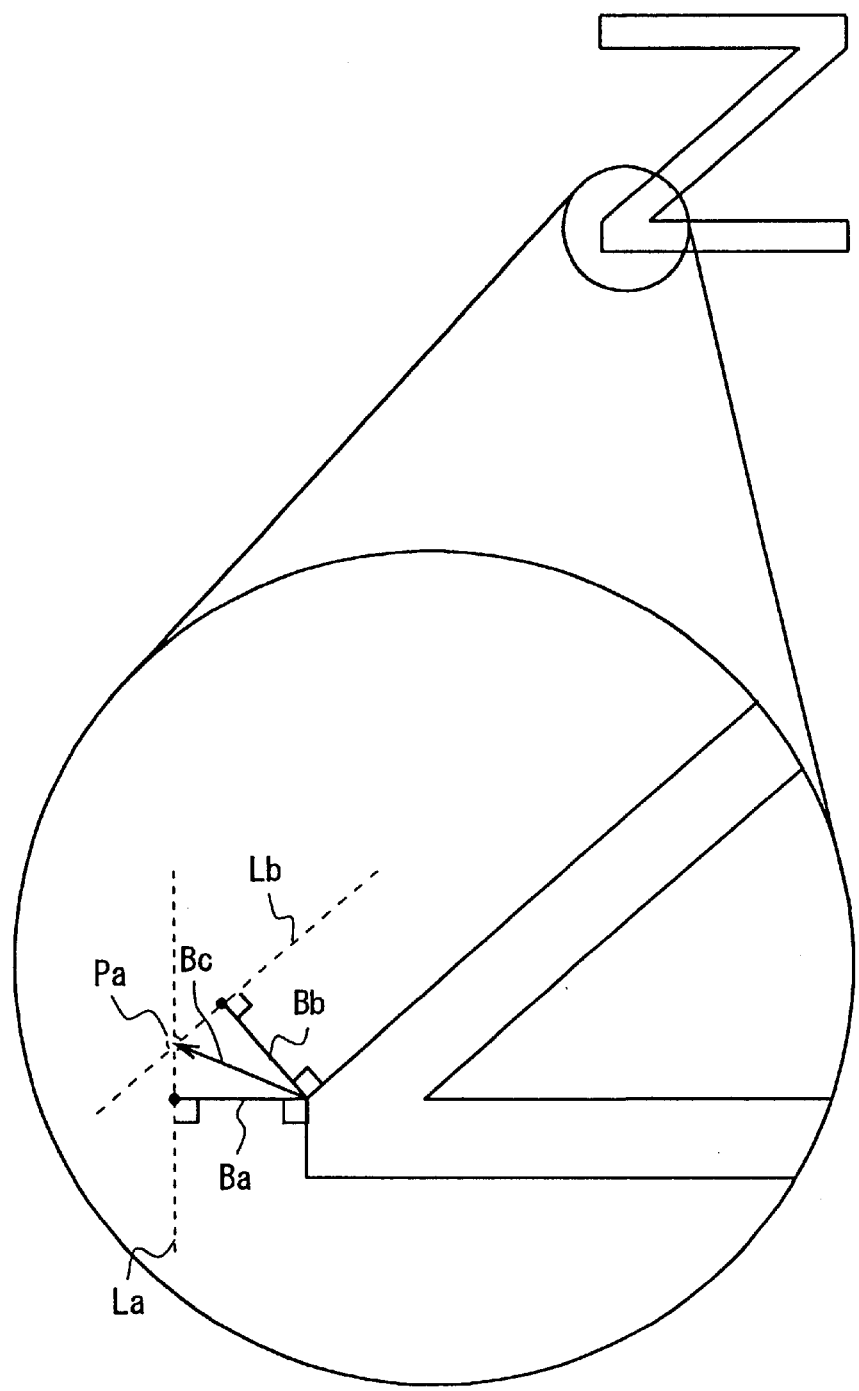
FIG. 11 is a schematic diagram explaining the formation of unit vectors in an enlarging direction.

For instance, a method for generating the unit vector in the enlarging direction will be described with reference to FIG. 11. All the vertexes of a character Z can generate two vectors in the enlarging direction on the basis of the vertex data composed of the coordinate and the normal vector of a vertex and the vertex data of vertexes located in the front and back of the vertex. That is to say, in the character Z, a vector formed by using the lower vertex data of a noticed vertex is regarded as a vector Ba and a vector formed by using the upper vertex data is regarded as a vector Bb. These vectors Ba and Bb are vectors extending vertically from line segments respectively constituting the outline of the character. When auxiliary lines La and Lb perpendicularly intersecting the two vectors Ba and Bb are respectively formed, the formed auxiliary lines La and Lb constitute an enlarged outline. A vector drawn from an origin to an intersection point Pa at which the auxiliary lines La and Lb intersect is regarded as a vector Bc in the enlarging direction. In such a manner, the unit vectors in the enlarging direction and the reducing direction are formed and held for all the vertexes.

At step S32, the CPU 3 determines and registers enlarging and reducing coefficients indicating the size to be enlarged and reduced on the basis of a value previously designated by the user to determine the vertex positions of an actual edge polygon model by employing the registered values. At step SP33, when the vertex positions of the edge polygon model are determined from the formed unit vectors in the enlarging and reducing directions in accordance with the enlarging and reducing coefficients, the CPU 3 decides whether or not the adjacent vectors in the enlarging and reducing directions among vectors in the enlarging and reducing directions drawn at the vertex positions of the edge polygon model from an origin intersect. As a result, when it is decided that the adjacent vectors in the enlarging and reducing directions intersect, the CPU 3 moves to step SP34. When it is decided that they do not intersect, the CPU 3 moves to step SP35.

Figure 7:
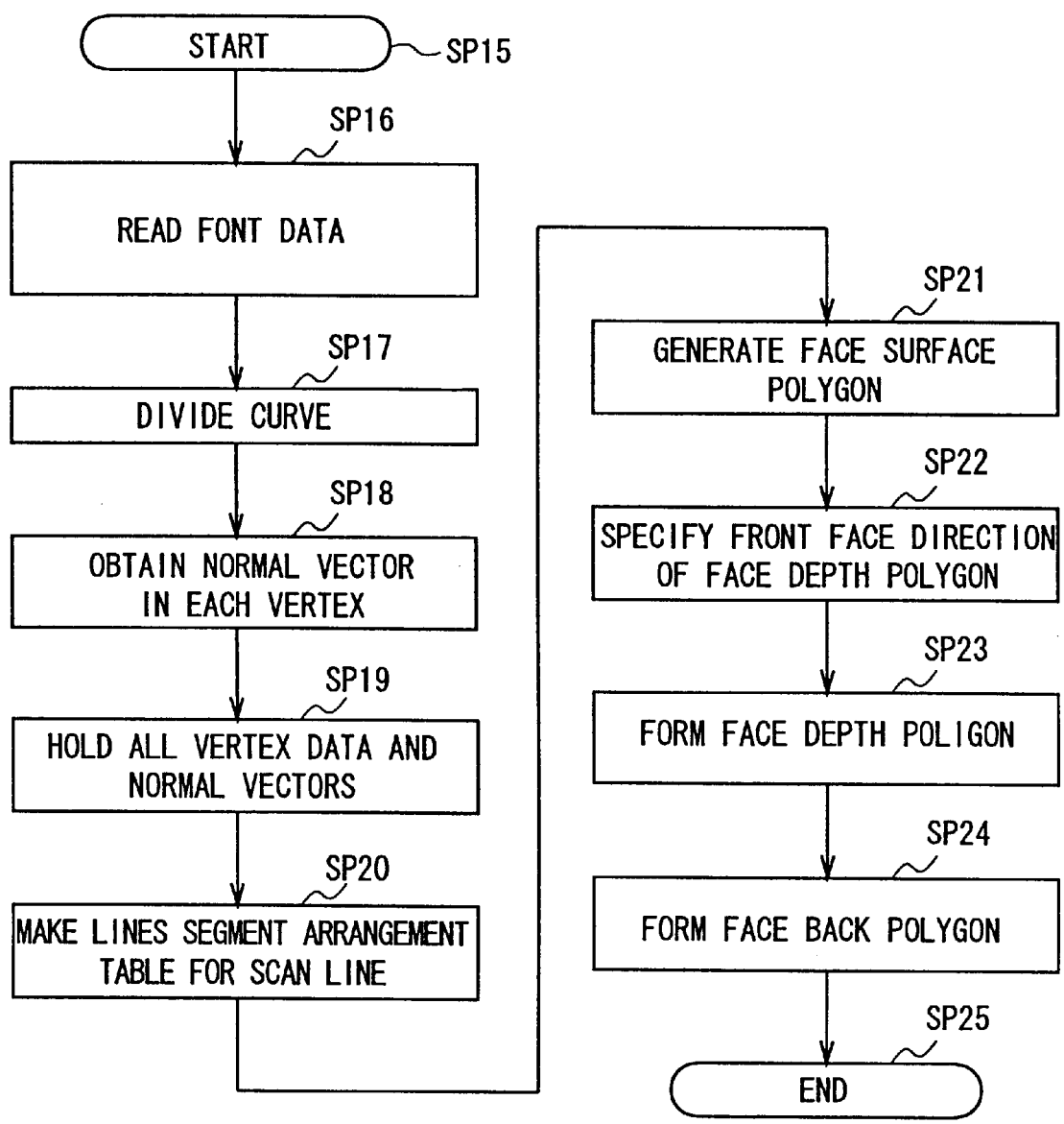
FIG. 7 is a flowchart showing a procedure for generating a three-dimensional character.
Figure 12:
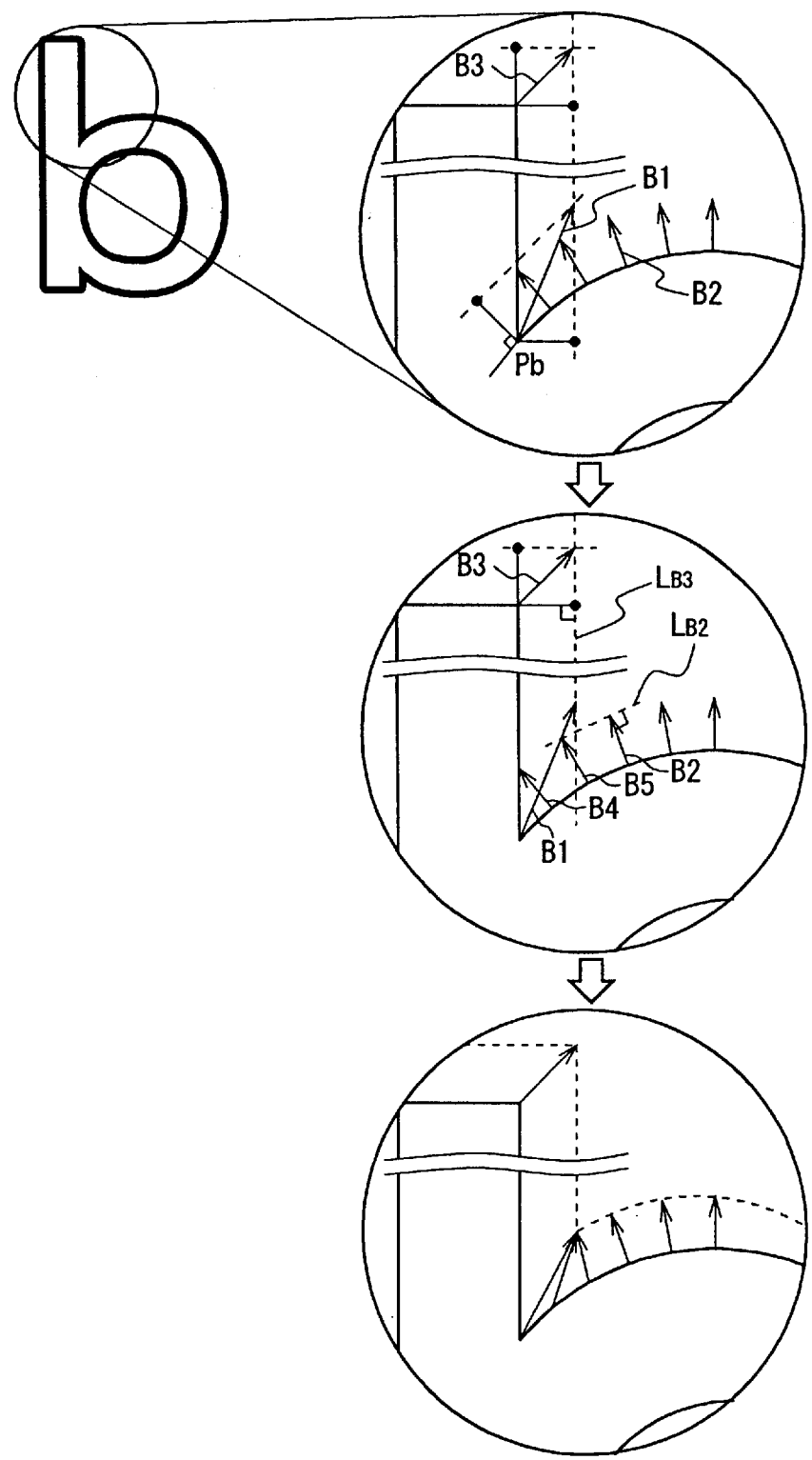
FIG. 12 is a schematic diagram explaining the recalculation of vectors in the enlarging direction.

At the step SP34, the CPU 3 recalculates vectors in the enlarging and reducing directions so that the adjacent vectors in the enlarging and reducing directions do not intersect. This avoids the generation of a recessed polygon or the damage of the three-dimensional character generating algorithm as shown in FIG. 7. For example, as shown in FIG. 12, when a vector like a vector B1 in the enlarging direction at the vertex Pb of a character b intersects a plurality of vectors B4 and B5 in the enlarging direction, the CPU 3 retrieves a vector B2 in the enlarging direction which the vector B1 does not intersect. Then, the CPU 3 decides the intersection point of line segments $L_{B2}$ and $L_{B3}$ in which the retrieved vector B2 in the enlarging direction intersects at right angles, as the vertex of the intersecting vectors B1, B4 and B5 in the enlarging direction to avoid the respective vectors B1, B4 and B5 in the enlarging direction from intersecting.

Further, when a coefficient for determining the size of an edge is set large, as in a space part in a character 0, the CPU 3 may possibly completely close the space. In this case, the CPU 3 is adapted to consider that there is no vector in the enlarging direction and treat the vertexes of the outline of an original character as the vertexes of the edges.

At step SP35, the CPU 3 makes the line segment arrangement table for a scan line as shown in FIG. 8 by employing the vertexes formed for the edges and the outline data of a character. At step SP37, the CPU 3 forms the depth polygon by employing the vertex coordinates and the normal vectors of the edges. At next step SP38, the CPU 3 forms the edge back surface polygon corresponding to the back surface of the formed edges. In this connection, since the enlarging and reducing coefficients of the front surface and the back surface may be different depending on the kinds of the edges, processing similar to those of the surface polygon need to be carried out.

According to the above described configuration, the CPU 3 obtains the outline data D1 showing the outline of a character on the basis of the character designated through the keyboard 27, generates the three-dimensional character data composed of the face polygon model D3 and the shadow polygon model D5 on the basis of the outline data D1 and generates the three-dimensional edge data composed of the edge polygon model D5 for emphasizing the outline in accordance with the outline of the formed character data. Then, the CPU 3 adds the edge data to the character data to form the three-dimensional character data composed of the polygon model D9 and displays the image-corresponding to the three-dimensional character data on the display 21.

According to the above described configuration, the three-dimensional character data is generated on the basis of the character designated through the keyboard 27, the three-dimensional edge data for emphasizing the outline is generated in accordance with the outline of the generated character data and the edge data is added to the character data to form the three-dimensional character data. Thus, when the three-dimensional character corresponding to the three-dimensional character data is superposed on an image to be edited which serves as the background of the three-dimensional character and displayed, the color of the background is designated so as to be different from that of the edge part of the three-dimensional character, so that a boundary between the three-dimensional character and the background can be emphasized. Thus, the video title of the three-dimensional characters can be effectively displayed on the image to be edited.

Figure 13:
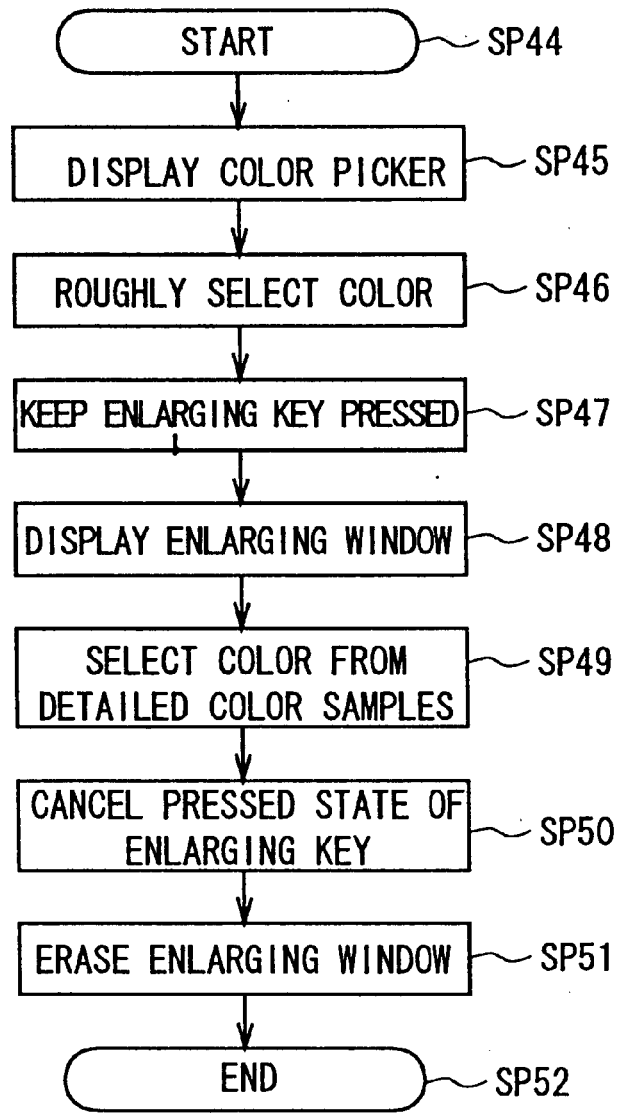
FIG. 13 is a flowchart showing a procedure for selecting colors by a color picker.
Figure 14:
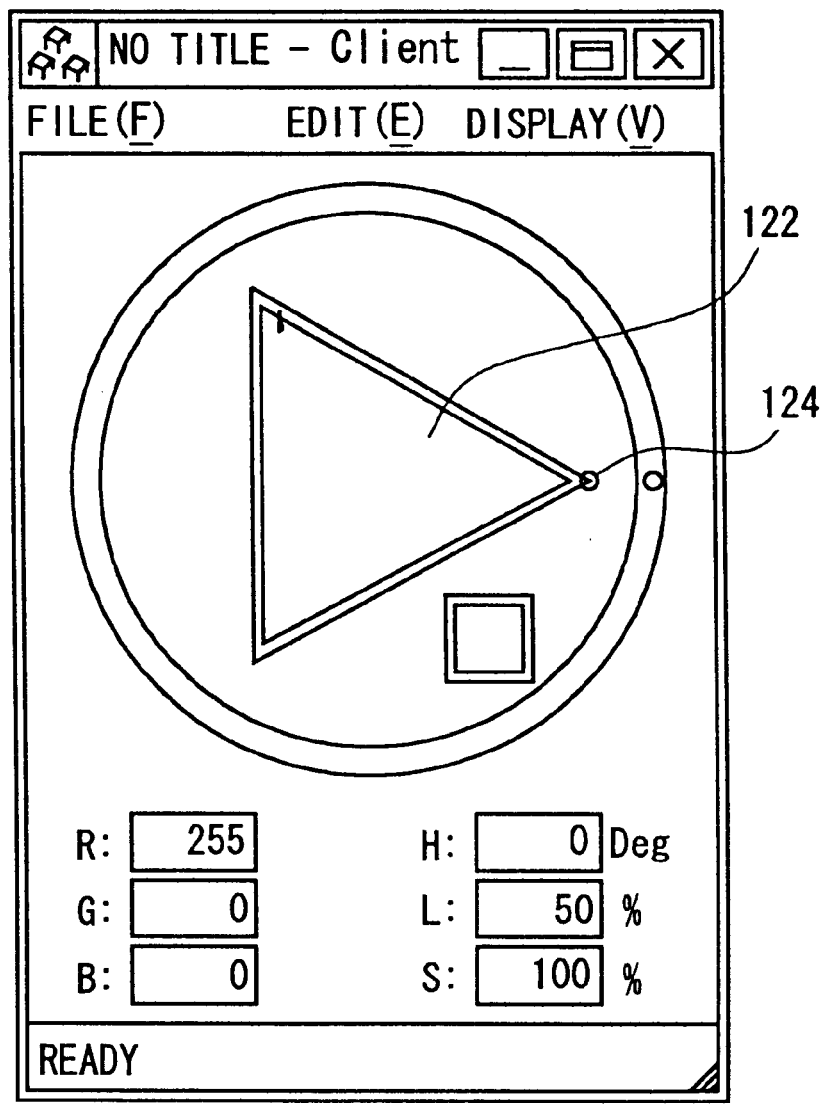
FIG. 14 is a schematic diagram explaining the display screen of the color picker.
Figure 15:
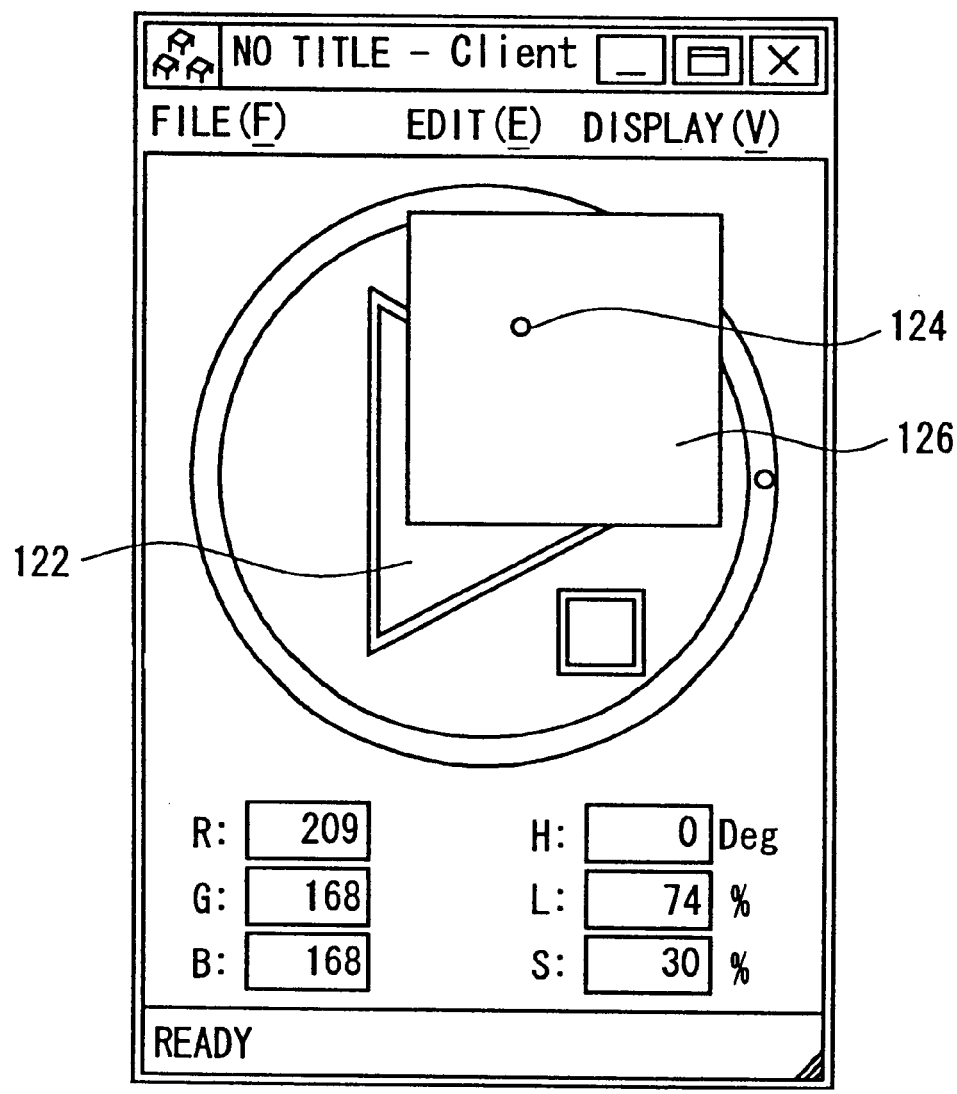
FIG. 15 is a schematic diagram explaining the display screen of the color picker.

(3) Procedure for Selecting Color by Color Picker Included in Application Program Now, a procedure for selecting color by a color picker which is carried out in a material setting step (SP6) of FIG. 4 will be specifically described by way of a flowchart shown in FIG. 13. In this case, the color picker for selecting colors is included in the application program for creating the video title. At step SP45 entering at step SP44, in the case where the edge shadow setting menu 76 is selected in the GUI screen 60 as shown in FIG. 3, when the user selects the material setting menu 74, the CPU 3 displays the color picker 120 as shown in FIG. 14 on the GUI screen 60. This color picker 120 displays a color selection operating part 122 at a position near its center and color samples are roughly displayed on the color selection operating part 122.

At step SP46, the CPU 3 moves a mouse pointer 124 to a part of color nearest to a desired color of the color samples displayed on the color selection operating part 122 of the color picker 120 in accordance with the operation of the user and keeps a mouse button in a clicked state (called it a hold, hereinafter). At step SP47, the CPU 3 presses an enlarging key preset to, for example, the right button of the mouse 31 and keeps the enlarging key pressed in accordance with the operation of the user.

At step SP48, the CPU 3 displays an enlarging window 126 and enlarges and displays the color samples in the periphery of the part designated by the mouse pointer 124 with a sufficient resolution on the enlarging window 126. At step SP49, the CPU 3 moves the mouse pointer 124 to the part of a desired color from the color samples displayed on the enlarging window 126 in accordance with the operation of the user to cancel the hold state and define the color, and applies the defined color to the three-dimensional character on the scene window 62 serving as an image editing screen. Then, at step SP50, when the pressed state of the enlarging key is cancelled in accordance with the operation of the user, the CPU 3 erases the enlarging window 126 from the GUI screen 60 at step SP51, and then, moves to step SP52 to finish the processing.

According to the above described configuration, the CPU 3 enlarges and displays a part of the color selection operating part 122 of the color picker 120 with high resolution on the enlarging window 126, hence the CPU 3 can display all the existing colors without enlarging the display area of the color picker 120.

According to the above mentioned configuration, a part of the color selection operating part 122 of the color picker 120 is enlarged and displayed as required, so that all the existing colors can be displayed without enlarging the display area of the color picker 120. Thus, a desired color can be selected while a conventional visibility is maintained.

(4) Procedure for Selecting Color by Group Property Dialogue

Figure 16:
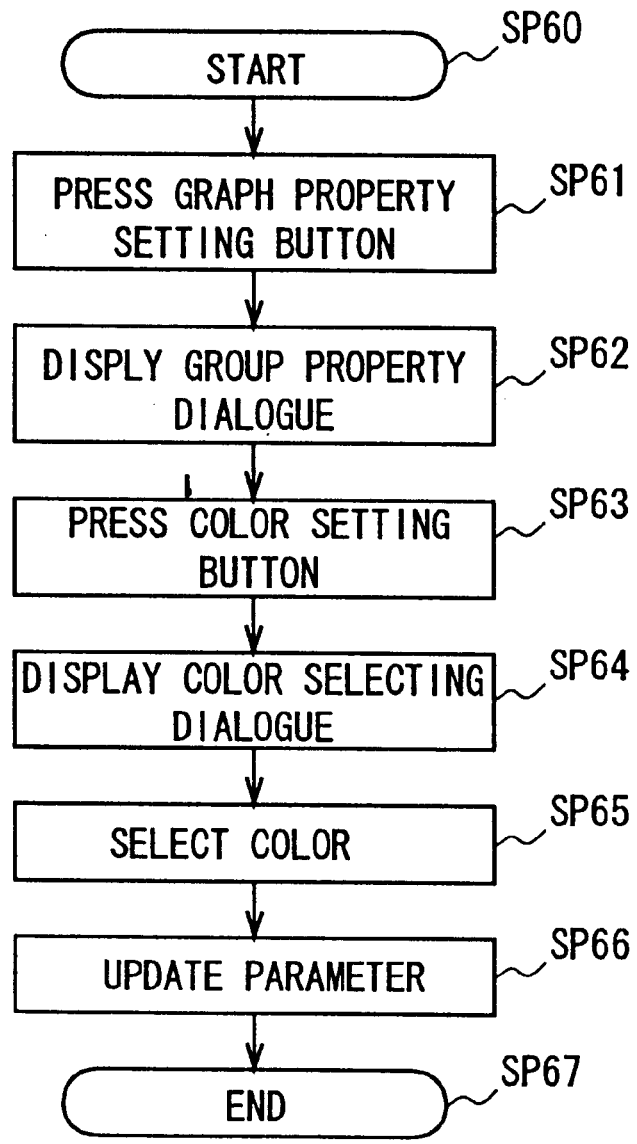
FIG. 16 is a flowchart showing a procedure for selecting colors by a group property dialogue.

Now, a procedure for selecting colors by a group property dialogue carried out in the material setting step (SP6) of FIG. 4 will be specifically described by employing a flowchart shown in FIG. 16. In this case, a color selecting dialogue for selecting colors is included in the operating system.

Figure 17:
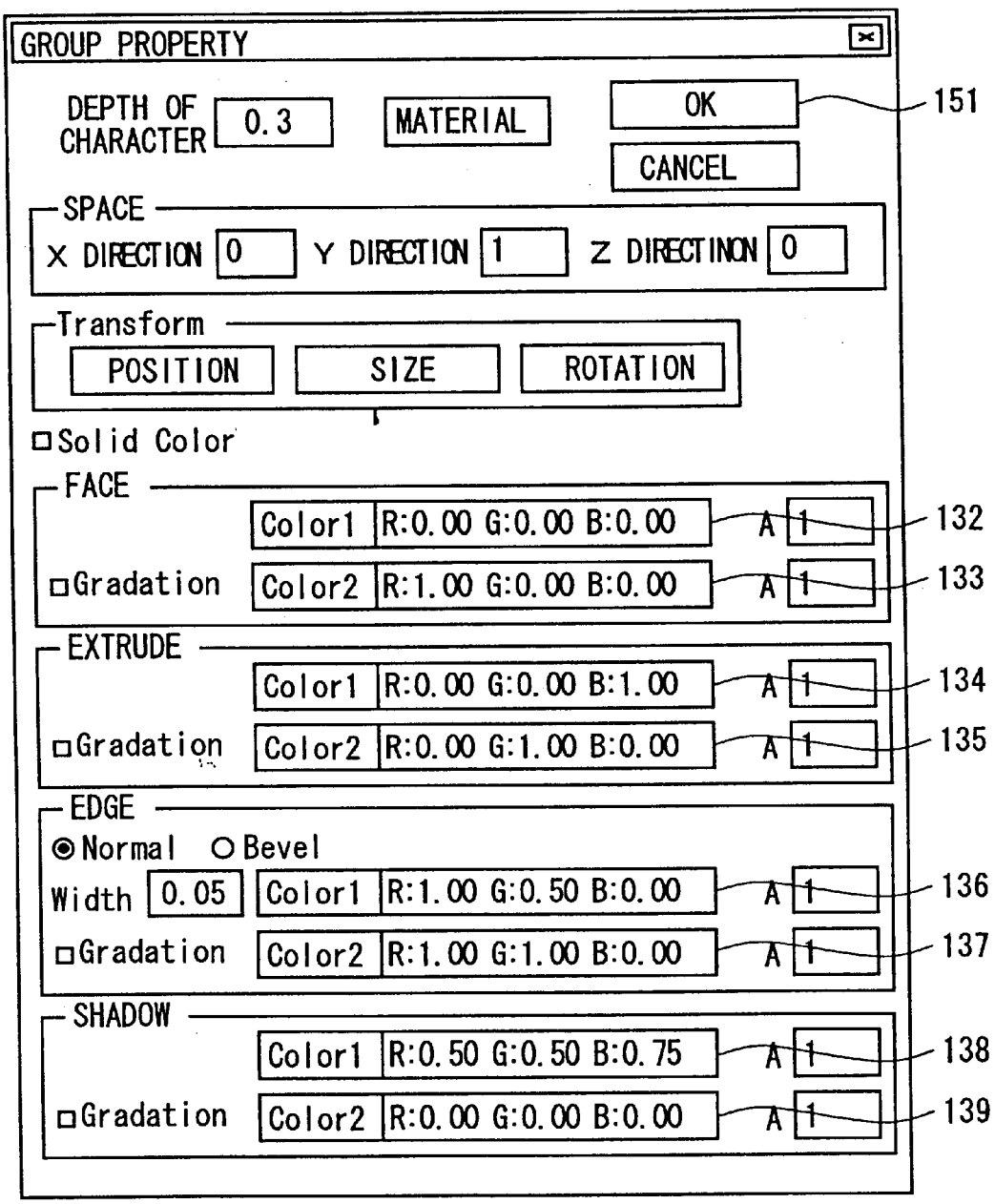
FIG. 17 is a schematic diagram explaining the display screen of the group property dialogue.

First of all, at step SP61 entering at step SP60, when the user clicks the group property setting button 71 under the state where the GUI screen 60 shown in FIG. 3 is displayed, the CPU 3 advances to step SP62 to display a group property dialogue 130 as shown in FIG. 17.

Figure 5:
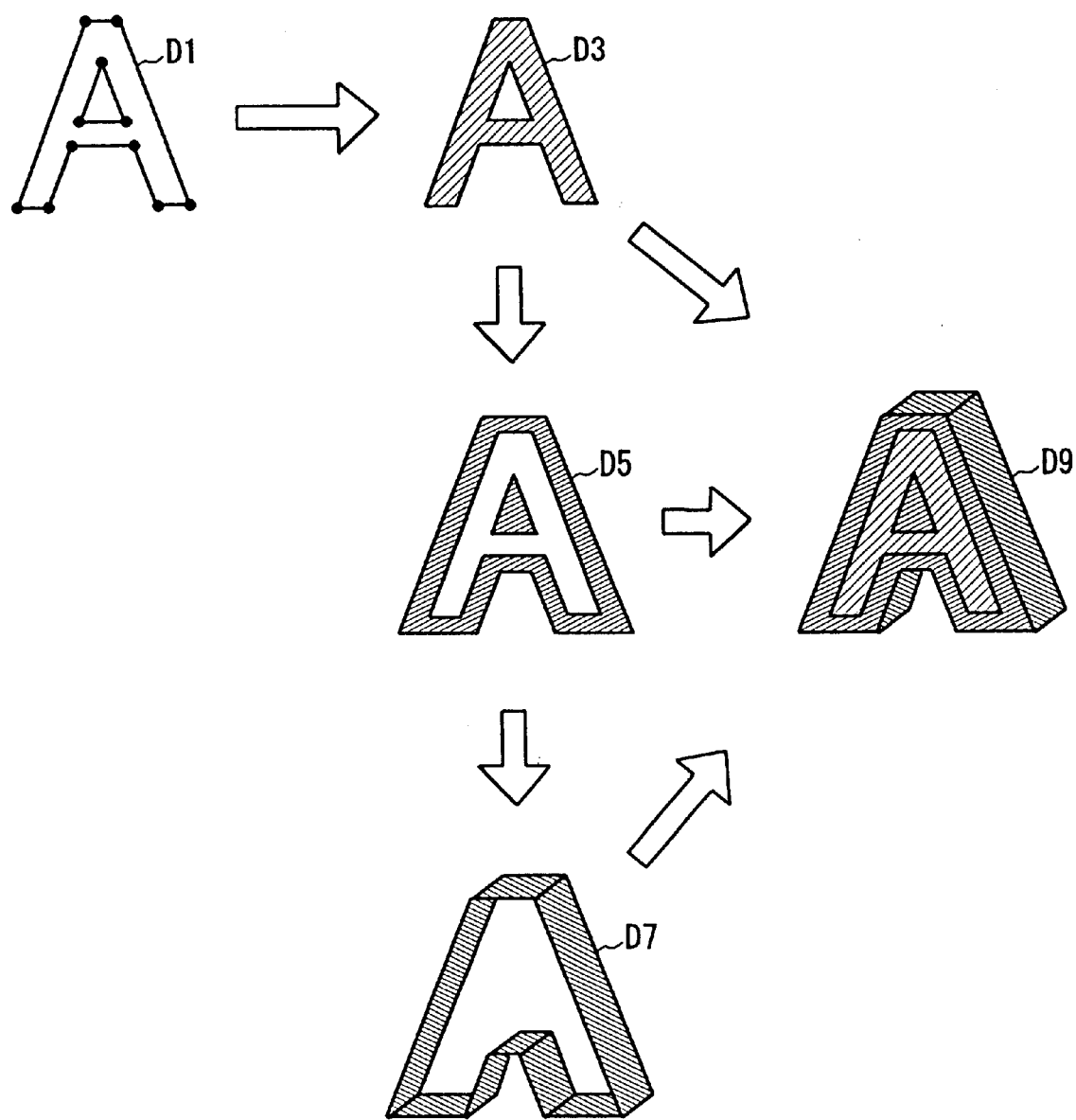
FIG. 5 is a schematic diagram explaining generation of the polygon model.

In this group property dialogue 130, there are displayed, with respect to the polygon model D9 (FIG. 5) shown in FIG. 5, a color setting button 132 for setting the color of the face polygon model D3 and a color setting button 133 for setting the gradation of the face polygon model D3, a color setting button 134 for setting the color of the shadow polygon model D7 and a color setting button 135 for setting the gradation of the shadow polygon model D7, a color setting button 136 for setting the color of the edge polygon model D5 and a color setting button 137 for setting the gradation of the edge polygon model D5 and a color setting button 138 for setting the color of the shadow of the polygon model D9 displayed on the scene window 62 (FIG. 3) and a color setting button 139 for setting the gradation of the shadow. These color setting buttons 132 to 139 show the respective parameter values of RGB currently set onto the buttons.

Figure 18:
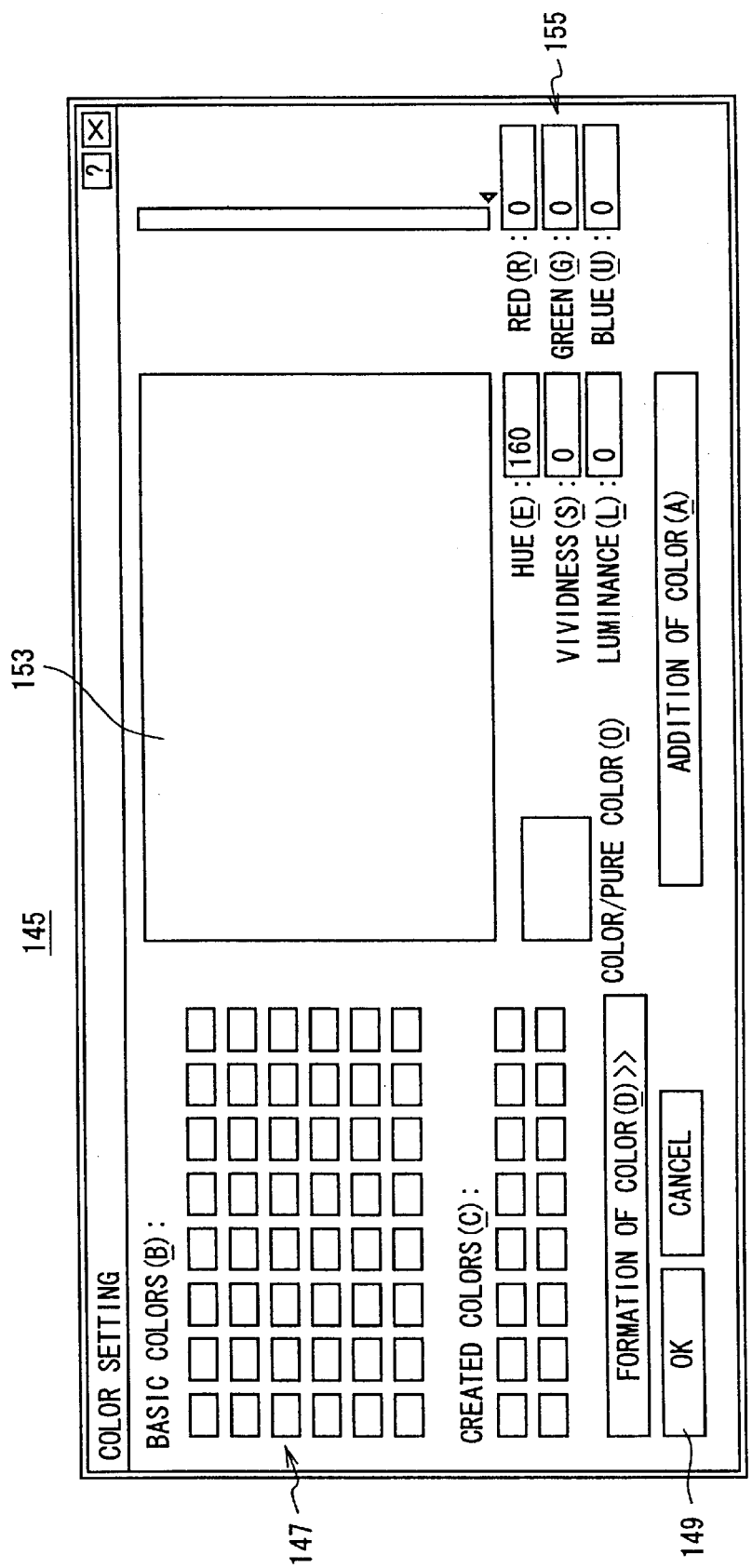
FIG. 18 is a schematic diagram explaining the display screen of a color selecting dialogue.

At step SP63, when the user clicks the color setting button of the polygon model whose color is to be changed out of the color setting buttons 132 to 139, the CPU 3 advances to step SP64 to display a color selecting dialogue 145 as shown in FIG. 18. At step SP65, the CPU 3 selects a desired color among basic colors 147 in accordance with the input operation of the user under the state where the color selecting dialogue 145 is displayed, and then, an OK button 149 is clicked to determine the color of the designated polygon model.

The CPU 3 advances to step SP66 to close the color selecting dialogue 145 and display the group property dialogue 130 and changes the respective parameter values of the selected color setting buttons 132 to 139 to set parameter values and displays the changed parameter values. Under this state, when the user clicks an OK button 151, the CPU 3 closes the group property dialogue 130 to apply a color to the three-dimensional characters displayed on the scene window (FIG. 3). Then, the CPU 3 moves to step SP67 to finish the processes.

According to the above mentioned configuration, the group property dialogue 130 displays the respective parameter values of RGB currently set onto the color setting buttons 132 to 139, so that the restricted display area of the group property dialogue 130 can be more effectively utilized than a conventional case in which the parameter values are displayed in an area different from an area where the color setting buttons are displayed.

According to the above stated configuration, since the respective parameter values of RGB currently set onto the color setting buttons 132 to 139 for displaying the color selecting dialogue 145 are displayed, the restricted display area of the group property dialogue 130 can be utilized more-effectively than a conventional form in which the parameter values are displayed in an area different from an area where the color setting buttons are displayed. Therefore, a display screen more efficient than a conventional display screen can be formed.

(5) Fluoroscopic Projection Conversion

Figure 19:
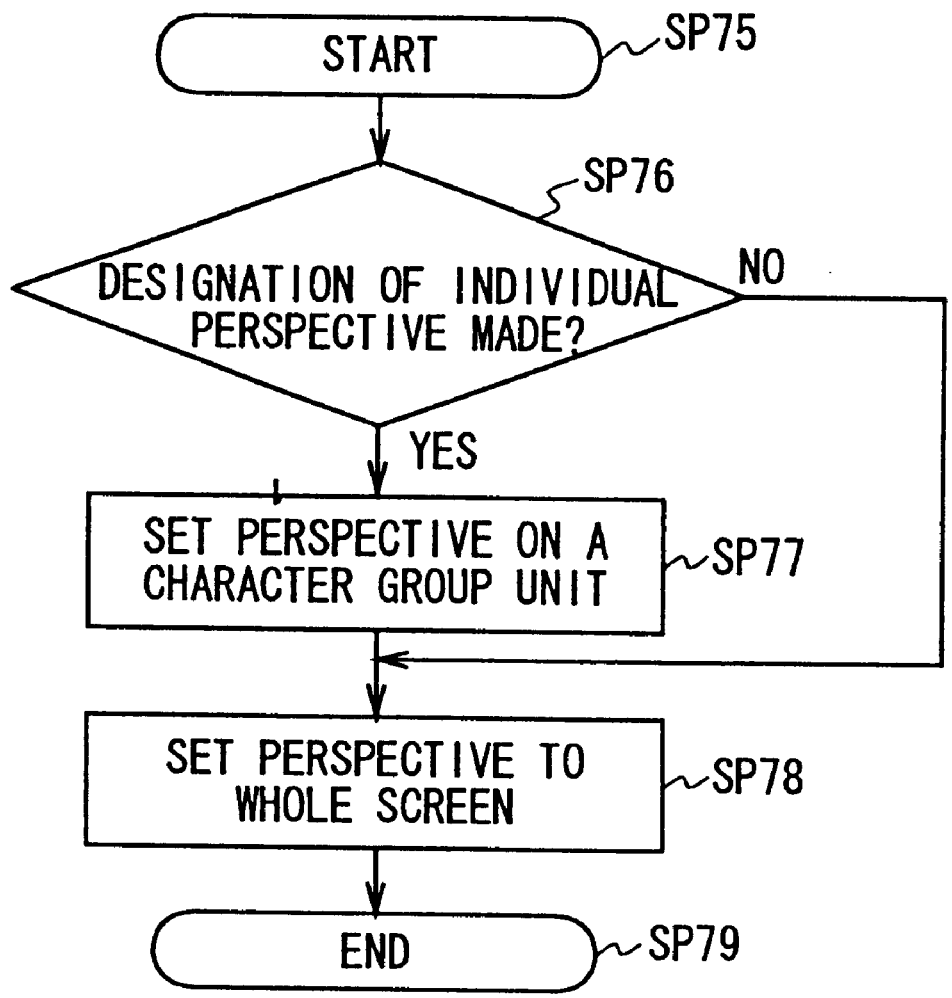
FIG. 19 is a flowchart showing a fluoroscopic projection conversion procedure.

Now, a fluoroscopic projection conversion procedure carried out in a perspective setting step (SP7) shown in FIG. 4 will be described by referring to a flowchart shown in FIG. 19. At step SP76 entering at step SP75, the CPU 3 decides whether or not a designation has been made to individually perform a fluoroscopic projection conversion (called a multi-perspective, hereinafter) on character strings composed of the polygon model D9 (FIG. 5), in accordance with the input information of the user. As a result, when the CPU 3 decides that the multi-perspective designation has been made, it moves to step SP77. When the CPU 3 decides that no multi-perspective designation has been made, it moves to step SP78.

At step SP77, the CPU 3 sets perspective to the character string which is a target of the multi-perspective for the fluoroscopic projection conversion. At that time, the character string subjected to the fluoroscopic projection conversion is displayed in a display area called a no-frame window. The CPU 3 advances to step SP78 to carry out perspective setting to the whole scene window 62 so that the perspective setting is performed relative to the character string which is not a target of the multi-perspective to apply the fluoroscopic projection conversion thereto.

Figure 20:
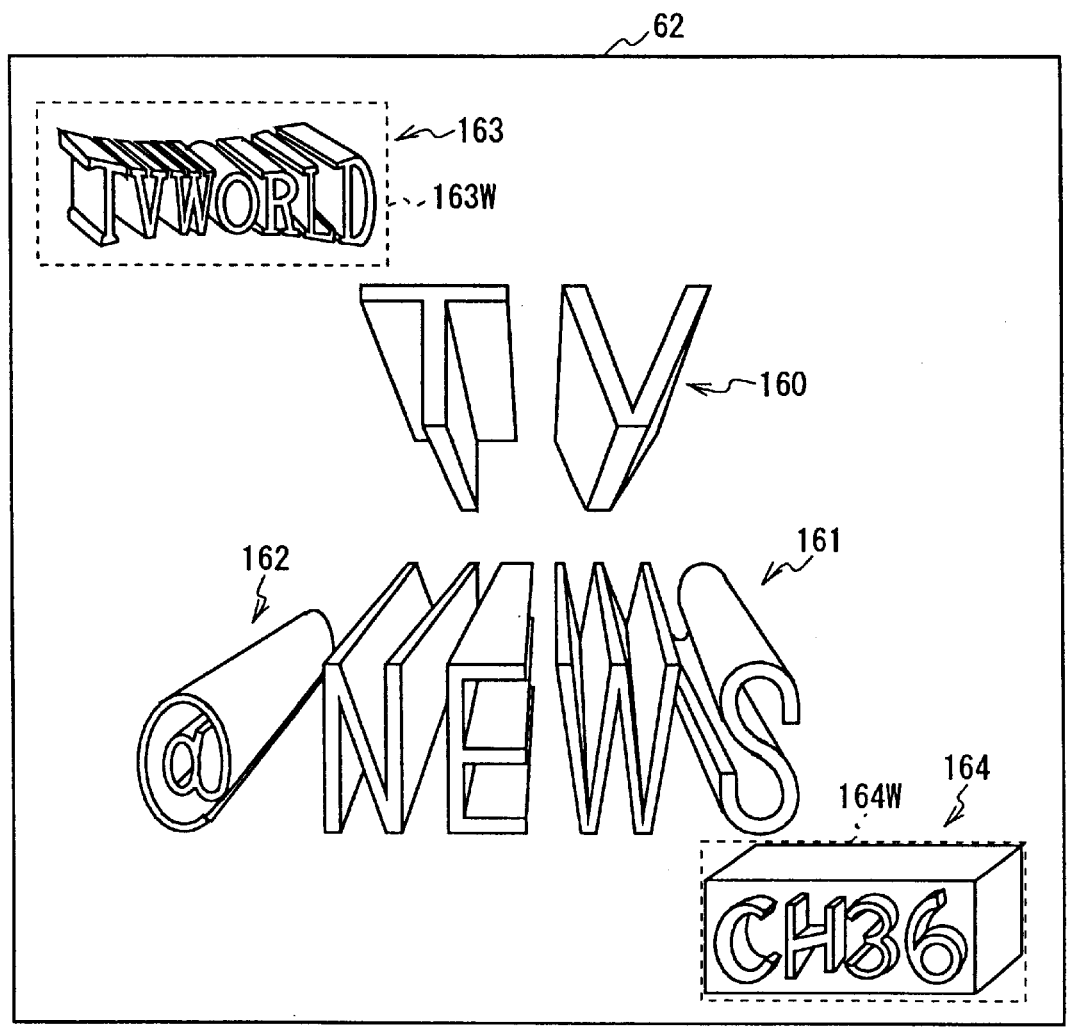
FIGS. 20 and 21 are schematic diagrams explaining a scene window upon multi-perspective selection.

FIG. 20 shows the scene window 62 on which the character strings 160 to 162 which are not targets of the multi-perspective are displayed, and further, the character strings 163 and 164 which are targets of the multi-perspective designation are displayed on no-frame windows 163W and 164W. The sizes of the no-frame windows 163W and 164W are determined by the smallest rectangular parallelepiped including the character strings subjected to the fluoroscopic projection conversion, on the basis of the size of the scene window 62 when the character strings undergo the fluoroscopic projection conversion processing. Since the size of the no-frame windows on the scene window 62 cannot be obtained until an image drawing processing is not completely performed once on the scene window 62, a minimum size of the no-frame window is calculated in the image drawing processing after a second time image drawing processing by using the size determined by the image drawing processing at a first time as a reference.

Figure 21:
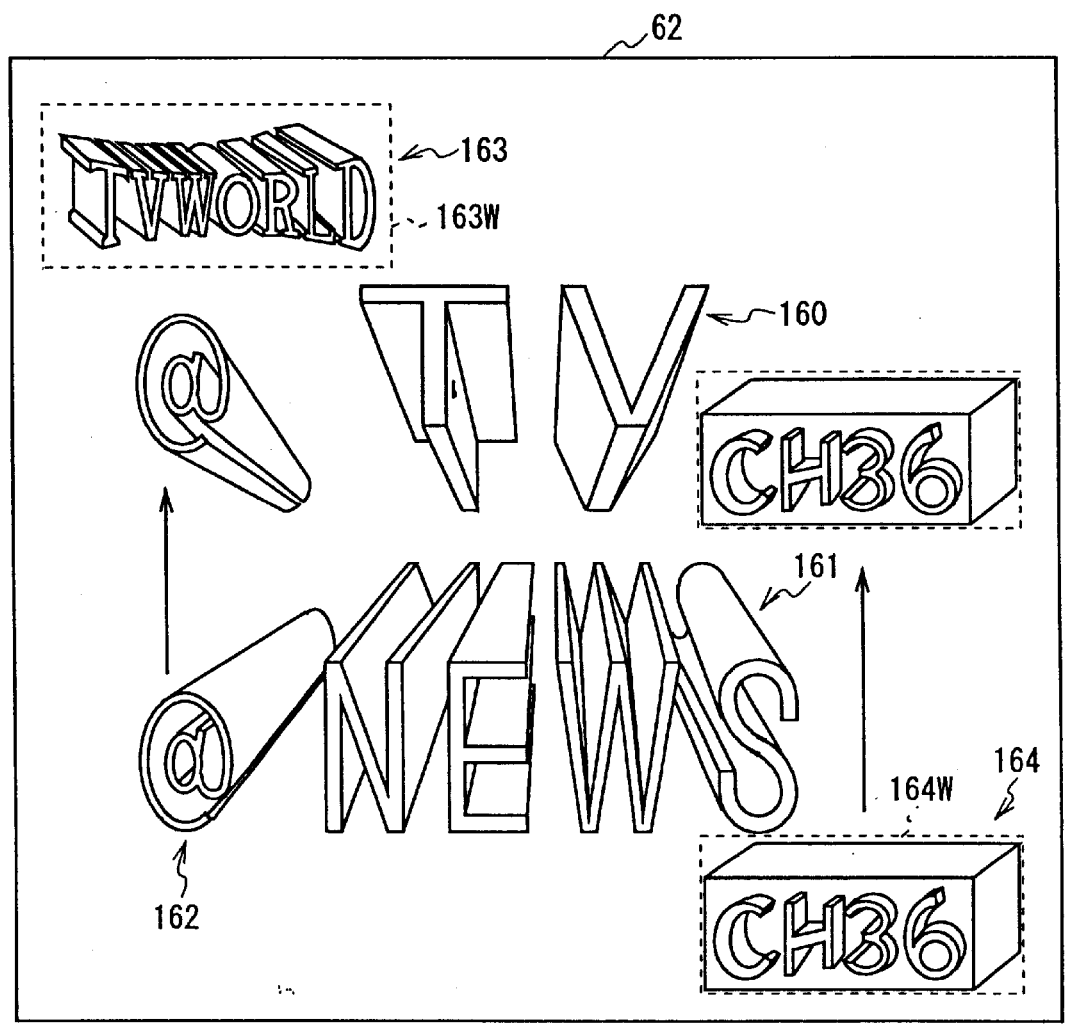

FIG. 21 in which parts corresponding to those shown in FIG. 20 are designated by attaching the same reference numerals thereto shows animation processing for moving the character string 162 which is not a target of the multi-perspective and the character string 164 which is a target of the multi-perspective upward. At that time, in the character string 162, which is not the target of the multi-perspective, the position of the character string relative to a visual point is moved. On the other hand, the character string 164, which is the target of the multi-perspective, is not changed under the fluoroscopic projection conversion. As described above, in the scene window 62, two kinds of animation processing including the animation process of the character string 162 displayed under a state in which no-frame window does not exist and the change of the display position of the no-frame window 164W can be carried out.

According to the above described configuration, the CPU 3 individually applies the fluoroscopic projection conversion to each character string of the video title composed of the three-dimensional characters formed in the virtual three-dimensional space area and displays the video title thus obtained on the scene window 62. Thus, when it is requested that a plurality kinds of three-dimensional character strings constituting the video title are displayed so as to be present in respectively independent space areas, there is not needed a labor for synthesizing screens obtained by individually respectively applying the fluoroscopic projection conversion to the plurality of kinds of three-dimensional character strings, different from the conventional case. Further, the CPU 3 displays a plurality of different kinds of three-dimensional character strings which undergo the fluoroscopic projection conversion on the same scene window 62, moves the three-dimensional character strings in the space areas where they are present in accordance with the request of the user or moves the space areas in which the three-dimensional character strings are present together with the three-dimensional character strings, so that the animation matching the request of the user can be created.

According to the above described configuration, the fluoroscopic projection conversion process is individually applied to each character string of the video title composed of the three-dimensional characters formed in the virtual three-dimensional space area and the video title thus obtained is displayed on the scene window 62, so that the video title composed of the three-dimensional character strings which exist in the respectively independent space areas can be easily formed in accordance with the request of the user. Accordingly, the maneuverability of the user can be more improved than before.

(6) Rotary Operation of Three-Dimensional Character

Figure 22:
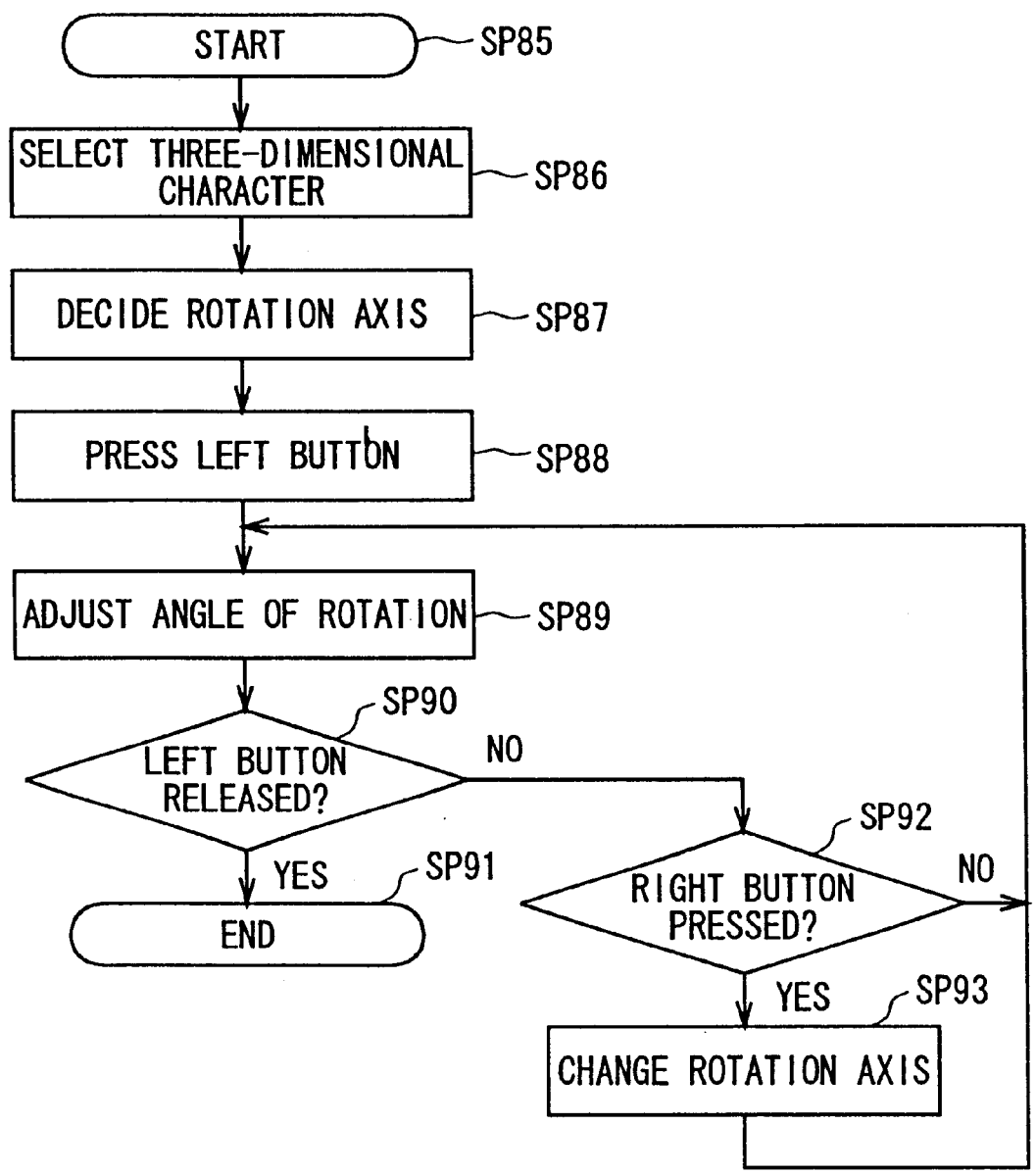
FIG. 22 is a flowchart showing the procedure of a rotating operation of a three-dimensional character.

Now, the procedure of the rotary operation of the three-dimensional characters carried out as required after the image drawing step (SP9) of the flowchart shown in FIG. 4 is finished will be described with reference to a flowchart shown in FIG. 22. At step SP86 entering at step SP85, when the user double clicks the left button (not shown) of the mouse 31 on the desired three-dimensional character of the video title displayed on the scene window 62, the CPU 3 first selects this three-dimensional character.

At step SP87, when the user clicks a desired one of the rotation axes, that is to say, the X-axis, the Y-axis and the Z-axis displayed on the rotation axis switch 69 with the mouse 31, the CPU 3 selects the clicked rotation axis. Then, at step SP88, when the user press the left button of the mouse 31 for the selected three-dimensional character, the CPU 3 starts the rotation of this three-dimensional character, advances to step SP89 and moves the mouse 31 while the left button of the mouse 31 is pressed (called it a drag, hereinafter), so that the angle of rotation of the three-dimensional character in the currently selected rotation axis is adjusted.

At step SP90, the CPU 3 decides whether or not the left button of the mouse 31 is released in accordance with the input operation of the user. As a result, when the CPU 3 decides that the left button is released, it moves to step SP91 to decide the display state of the selected three-dimensional character and finish the processes. When the CPU 3 decides that the left button is not released, it moves to step SP92.

At step SP92, the CPU 3 decides whether or not the right button of the mouse 31 was pressed by the user. As a consequence, when the CPU 3 decides that the right button is not pressed, it returns to the step SP89 to repeat the operations. At step SP93, the CPU 3 successively changes the rotation axes in regular order of the X-axis, the Y-axis, the Z-axis and the X-axis, . . . , and then, returns to the step SP89 to adjust the angle of rotation of the changed rotation axis.

According to the above mentioned configuration, when the adjustment of the angle of rotation in the rotation axis is completed under such a state that the left button of the mouse 31 is pressed and dragged and the angle of rotation of the three-dimensional character in the desired rotation axis is adjusted, the CPU 3 changes the rotation axis for adjusting the angle of rotation in accordance with a predetermined order by pressing the right button of the mouse 31. Thus, the rotation axis can be changed, without performing an operation for selecting a desired rotation axis from the rotation axis switch 69 as in the conventional case.

According to the above mentioned configuration, the rotation axes are sequentially changed in accordance with the predetermined order whenever the right button of the mouse 31 is pressed. Therefore, the rotation axis can be selected more simply than a conventional form in which a desired rotation axis is selected from the rotation axis switch 69. Accordingly, the rotary operation of the three-dimensional character can be carried out more easily than before.

(7) Formation and Control of Animation Data

Now, a method of generating and controlling the animation data of the three-dimensional character performed as required after the image drawing processing step (SP9) of the flowchart shown in FIG. 4 is finished will be described below. The video title generating apparatus 1 adopts, as an animation method for applying a smooth movement to the formed video title, a method called a key frame animation for initially preparing a plurality of reference frames (called them key frames, hereinafter) and inserting a plurality of images obtained by interpolating the positions of the three-dimensional characters in the respective key frames by straight lines or curves between the key frames to generate animation data.

Figure 23:
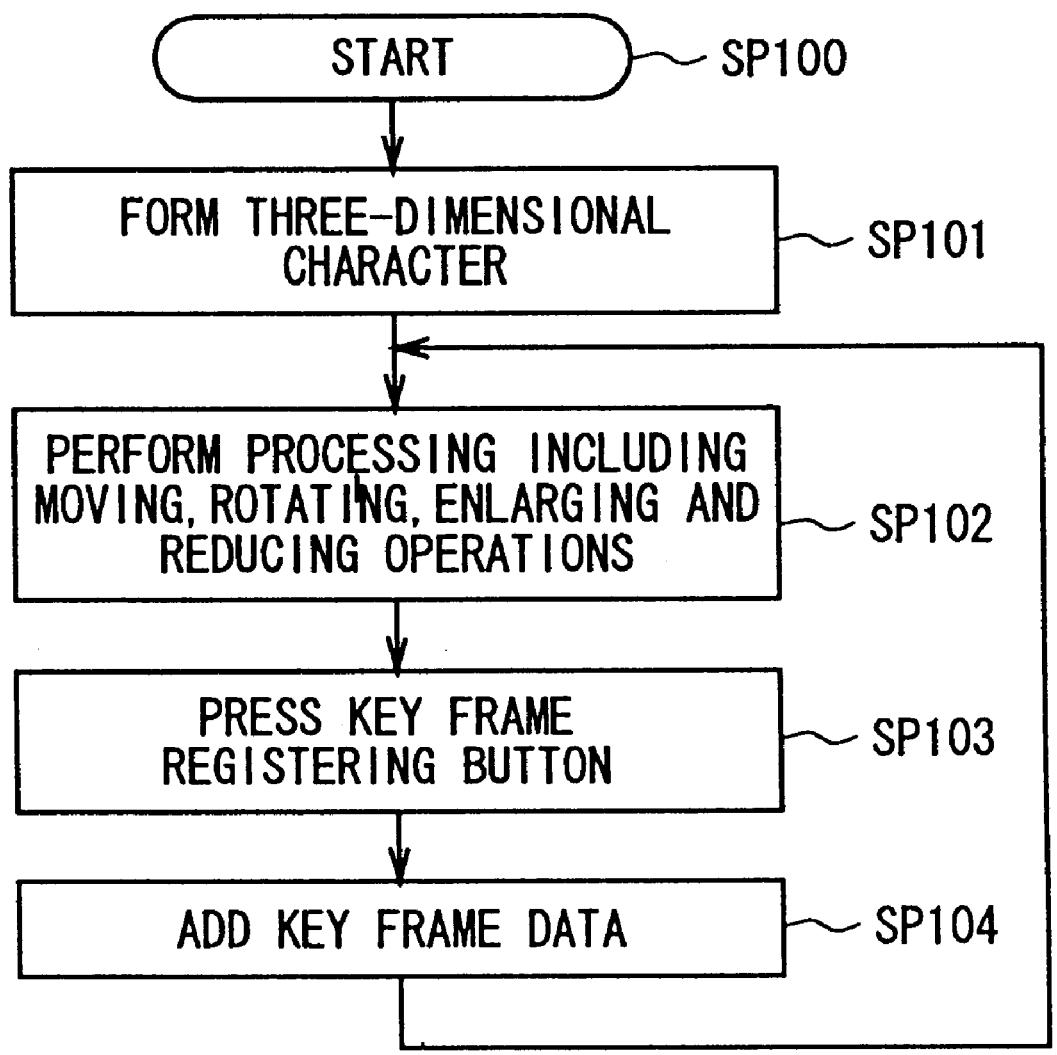
FIG. 23 is a flowchart showing a procedure for generating a key frame animation.

A procedure for generating the key frame animation will be described below by referring to a flowchart shown in FIG. 23. At step SP 101 entering at step SP100, the CPU 3 successively repeats the polygon model generating procedure shown in FIG. 4 to form a three-dimensional character. At step SP102, the CPU 3 applies image processing such as moving, enlarging, reducing and rotating processing, to the above described three-dimensional character in accordance with the input operation of the user to obtain a motion image.

Next, at step SP103, when the user clicks the key frame addition button 90 in the GUI screen 60 illustrated in FIG. 3, the CPU 3 transmits the display state of the current three-dimensional character to the document object 48 from the GUI object 42 shown in FIG. 2 as the message information M2 and advances to step SP104. The CPU 3 is adapted to add the animation data to the respective nodes of a hierarchical data structure called a scene graph shown in FIG. 24 and employed in the document object 48. In this event, the CPU 3 adds the data added only to the nodes which perform an animation operation and does not add the data to the nodes which do not perform the animation operation.

Figure 24:
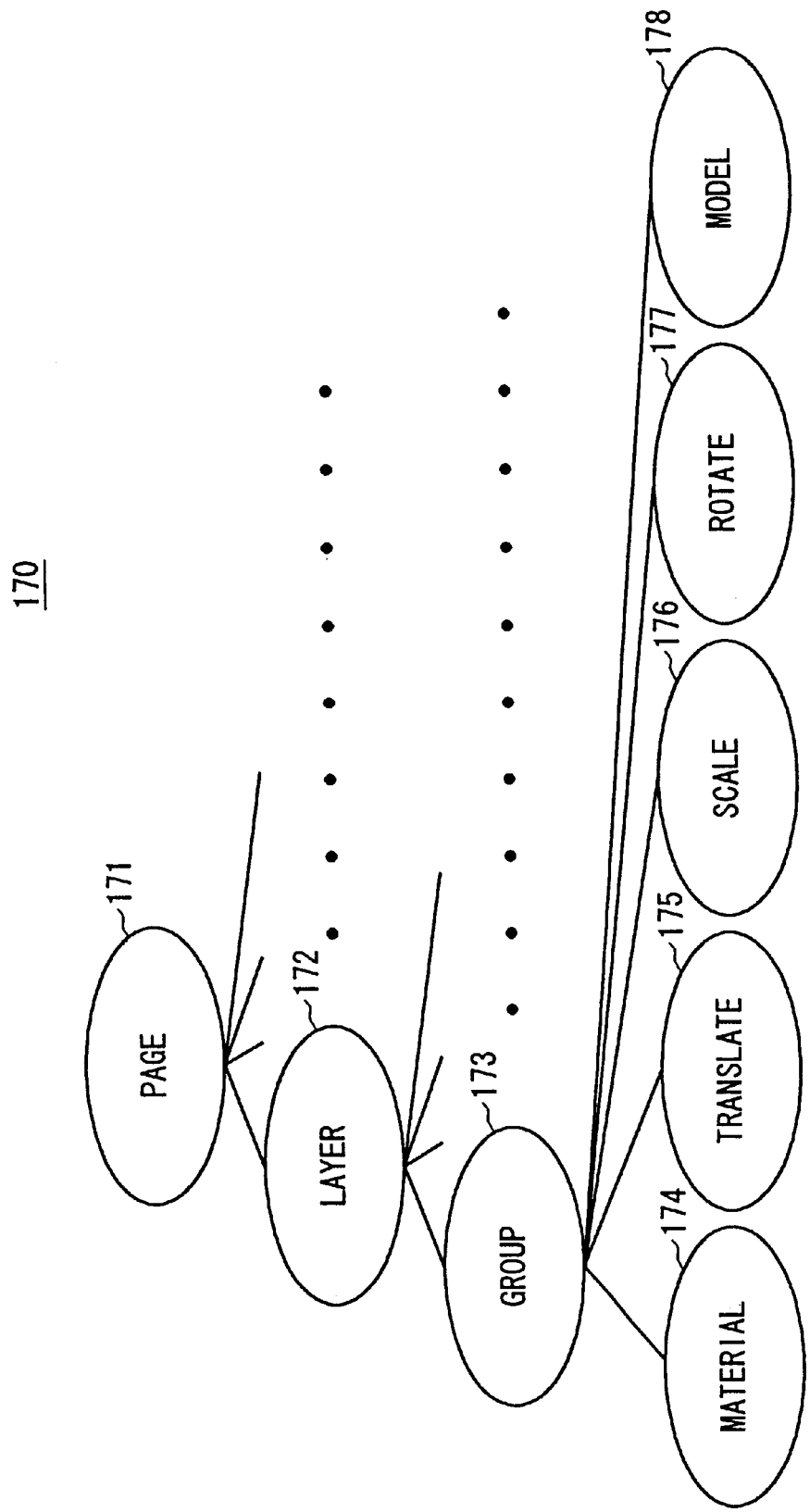
FIG. 24 is a schematic diagram explaining a scene graph.

Specifically, as illustrated in FIG. 24, the scene graph 170 is composed of a page node 171, layer node 172, group nodes 173, a material node 174, a translate node 175, a scale node 176, a rotate node 177 and a model node 178.

The page node 171 holds information of the entire motion image. The layer nodes 172 hold the information on layers. The group nodes 173 hold the information on groups. The material node 174 holds the information on the color or texture of the polygon model. The translate node 175 holds the information on the polygon model in the virtual three-dimensional space area. The scale node 176 holds the information of the enlarge and reduction ratios of the polygon model. The rotate node 177 holds the rotating state of the polygon model. The model node 178 holds the information of the characteristics of a display model itself such as a font or character data.

According to the above described configuration, the CPU 3 stores only the data of the three dimensional character which performs the animation operation relative to the key frames, so that it reduces the quantity of data to be stored more than a conventional configuration in which the three-dimensional character data of the respective frames are entirely stored by treating all the video title as the motion image. Further, since the CPU 3 controls the still image and the motion image in the same data structure, the control of the video title can be controlled more simply than a conventional example in which the still image and the motion image are separately controlled.

According to the above described configuration, since only the image data of an area which performs the animation operation relative to a reference still image is successively stored, the data to be stored can be reduced more than a case in which all the image data of the respective frames is stored. Accordingly, the image data can be controlled more efficiently than before.

(8) Procedure for Transmitting Video Title

Figure 25:
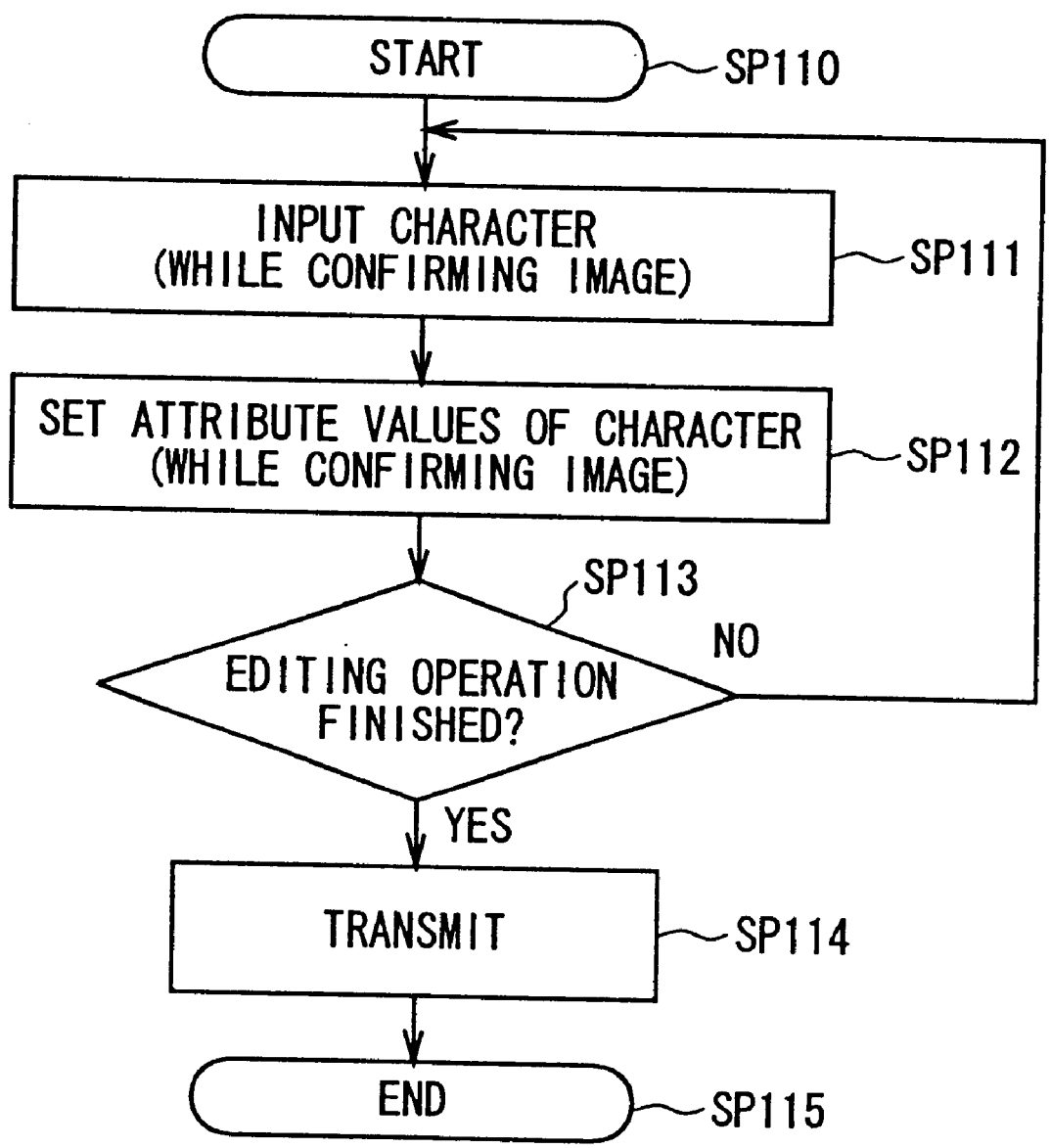
FIG. 25 is a flowchart showing a procedure for transmitting a video title.

A series of operations including generating, editing and transmitting the video title will be described below. A procedure for transmitting the video title will be specifically described by way of a flowchart shown in FIG. 25. At step SP111 entering at step SP110, when the user designates the desired character through the keyboard 27, the CPU 3 displays a three-dimensional character corresponding to the character on the display 21 (FIG. 1) through the graphics accelerator 13 (FIG. 1).

At step SP112, when the user sets various kinds of attribute values such as a position, a size and a material, etc., the CPU 3 instantaneously displays a three-dimensional character corresponding to the set attribute values on the display 21 (FIG. 1) through the graphics accelerator 13 (FIG. 1). In the video title generating apparatus 1, when the user inputs input information through the keyboard 27 (FIG. 1), a three-dimensional character corresponding to the input information can be quickly displayed on the display 21. Therefore, the user can perform an editing operation while he or she interactively recognizes an input result.

At step SP113, the CPU 3 decides whether or not the editing operation is to be finished on the basis of the operation input of the user. As a consequence, when the CPU 3 decides that it is further necessary to apply a modification to the three-dimensional character displayed on the display 21, it returns to the step SP111 to continue the editing operation. When the CPU 3 decides that the editing operation is to be finished, the CPU 3 moves to step SP114.

At step SP114, the CPU 3 supplies the video title to the frame buffer from the graphics accelerator 13 to synthesize the video title with an externally supplied image and to output and display thus synthesized video title onto the monitor 23. Then, the CPU 3 moves to step SP115 to complete the procedure.

According to the above mentioned configuration, the CPU 3 converts the three-dimensional character formed in accordance with the input operation of the user into an image for synthesizing a video corresponding to the three-dimensional character through the graphics accelerator 13 and instantaneously displays the image thus converted on the display 21, so that the user performs an editing operation while interactively recognizing the input result. Further, the CPU 3 transfers the video title to the frame buffer 15 from the graphics accelerator 13 in accordance with the input operation of the user, synthesizes the video title with the image to be edited by the frame buffer 15 and outputs and displays the video title thus synthesized onto the monitor 23. Thus, a labor or time required for a transmitting operation can be saved.

According to the above stated configuration, the image for the video title composed of the three-dimensional characters can be instantaneously displayed on the display 21 in accordance with the operation and input of the user. Upon transmitting the video title, the video title data is transferred to the frame buffer 15 from the graphics accelerator 13. Then, the video title is synthesized with an externally supplied image by the frame buffer 15 and the video title thus synthesized is displayed on the monitor 23. Thus, operations for generating, editing and transmitting the three-dimensional characters required in a conventional example can be simplified, hence a maneuverability can be more improved than before.

(9) Other Embodiments

In the above described embodiment, the right button of the mouse 31 is used as an enlarging key. However, the present invention is not limited thereto, and an arbitrary key on the keyboard 27 can be used as an enlarging key.

Further, in the above mentioned embodiment, the desired color is selected from the basic colors 147. However, the present invention is not limited thereto, and a desired color sample can be selected from a color display area 153 which displays color samples more specific than the basic colors 147 as shown in FIG. 18 or a color can be set by setting numeric values in a color parameter setting area 155.

Further, in the above described embodiment, the parameter values of RGB are displayed on the color setting buttons 132 to 139. However, the present invention is not limited thereto and a variety of other parameter values such as H (Hue), L (luminance) and S (Saturatuin) can be displayed.

Furthermore, in the above described embodiment, the three-dimensional character corresponding to the designated character is formed. However, the present invention is not limited thereto and can be widely applied to an apparatus for transforming various kinds of display objects such graphic forms into three-dimensional forms.

As described above, according to the present invention, the form of a character designated by the user through an input means out of a plurality of characters which are provided to the user is transforms into the three-dimensional form, and the three-dimensional character is displayed on a display means in accordance with designation of the character through the input means. Thereby, the character can be simply transformed into the three-dimensional form only by designating the character through the input means, without performing complicated operations as in the conventional case, and thus making it possible to realize a character generator capable of improving operability as compared with conventional devices.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A character generator for generating a character signal, comprising:
   means for inputting a plurality of characters by manipulating an input device having a plurality of keys each associated with a respective character such that each character is inputted by actuating a respective key of the input device;
   means for forming a three-dimensional image or images corresponding to said inputted characters by synthesizing face data, edge data and shadow data based on outline data corresponding to said input characters so as to generate said character signal such that said inputted characters look three-dimensional when viewed;
   wherein each inputted character is viewable on a screen so as to look three-dimensional when a user actuates only the single respective key associated with the respective character one time without actuating any other keys or functions thereafter; and
   means for simultaneously controlling a plurality of pages and layers containing edited and/or unedited characters and images.

2. A character generating method of generating a character signal, comprising the steps of:
   inputting a plurality of characters by manipulating an input device having a plurality of keys each associated with a respective character such that each character is inputted by actuating a respective key of the input device;
   forming a three-dimensional image or images corresponding to said inputted characters by synthesizing face data, edge data and shadow data based on outline data corresponding to said input characters so as to generate said character signal such that said inputted characters look three-dimensional when viewed;
   wherein each inputted character is viewable on a screen so as to look three-dimensional when a user actuates only the single respective key associated with the respective character one time without actuating any other keys or functions thereafter; and
   simultaneously controlling a plurality of pages and layers containing edited and/or unedited characters and images.

3. A character generator for generating a character signal, comprising:
   means for inputting desired characters by manipulating an input device having a plurality of keys each associated with a respective character such that each character is inputted by actuating a respective key of the input device;
   means for generating a polygon model or models corresponding to said inputted characters;
   means for performing processing on said polygon model or models, said processing including synthesizing face data, edge data and shadow data based on outline data corresponding to said input characters so as to generate said character signal such that said inputted characters look like three-dimensional images when viewed;
   wherein each inputted character is viewable on a screen so as to look three-dimensional when a user actuates only the single respective key associated with the respective character one time without actuating any other keys or functions thereafter; and
   means for simultaneously controlling a plurality of pages and layers containing edited and/or unedited characters and images.

4. A character generating method of generating a character signal, comprising the steps of:
   inputting desired characters by manipulating an input device having a plurality of keys each associated with a respective character such that each character is inputted by actuating a respective key of the input device;
   forming a polygon model or models corresponding to said inputted characters;
   performing processing on said polygon model or models, said processing including synthesizing face data, edge data and shadow data based on outline data corresponding to said input characters so as to generate said character signal such that said inputted characters look like three-dimensional images when viewed;

wherein each inputted character is viewable on a screen so as to look three-dimensional when a user actuates only the single respective key associated with the respective character one time without actuating any other keys or functions thereafter; and simultaneously controlling a plurality of pages and layers containing edited and/or unedited characters and images.

5. A character generator comprising:

input means for designating a character selected from a plurality of characters by manipulating an input device having a plurality of keys each associated with a respective character such that the character is designated by actuating a respective key of the input device;

three-dimensionally generating means for transforming a form of a the character designated by a user through said input means by synthesizing face data, edge data and shadow data based on outline data corresponding to an input character such that said input character looks three-dimensional when viewed;

display control means for displaying said character three-dimensionally generated by said three-dimensionally generating means on a display means in accordance with the designation of the character through said input means;

wherein each inputted character is viewable on the display means so as to look three-dimensional when a user actuates only the single respective key associated with the respective character one time without actuating any other keys or functions thereafter; and page and layer control means for simultaneously controlling a plurality of pages and layers containing edited and/or unedited characters and images.

6. The character generator according to claim 5, wherein said plurality of characters are respectively assigned to said plurality of keys arranged on said input means.

7. A character generating method, comprising the steps of:

inputting a desired character selected from a plurality of characters by manipulating an input means having a plurality of keys each associated with a respective character such that the character is inputted by actuating a respective key of the input means;

transforming a form of the character designated by a user through said input means by synthesizing face data, edge data and shadow data based on outline data corresponding to an input character such that said input character looks three-dimensional when viewed, displaying the three-dimensionally generated character on display means in accordance with the designation of the character through said input means;

wherein each inputted character is viewable on the display means so as to look three-dimensional when a user actuates only the single respective key associated with the respective character one time without actuating any other keys or functions thereafter; and simultaneously controlling a plurality of pages and layers containing edited and/or unedited characters and images.

8. The character generating method according to claim 7, wherein said plurality of characters are respectively assigned to a said plurality of keys arranged on said input means.

9. A character generator, comprising:

input means for inputting a plurality of characters by manipulating an input device having a plurality of keys each associated with a respective character such that each character is inputted by actuating a respective key of the input device;

three-dimensionally generating means for, when plural kinds of characters are designated through said input means, respectively transforming the designated plural kinds of characters into three-dimensional forms within a virtual three-dimensional space area to generate three-dimensional characters by synthesizing face data, edge data and shadow data based on outline data corresponding to input characters such that said input characters look three-dimensional when viewed;

display control means for individually and independently projecting said three-dimensional characters on a display screen of display means;

wherein each inputted character is viewable on the display so as to look three-dimensional when a user actuates only the single respective key associated with the respective character one time without actuating any other keys or functions thereafter; and page and layer control means for simultaneously controlling a plurality of pages and layers containing edited and/or unedited characters and images.

10. The character generator according to claim 9, wherein said display control means moves said three-dimensional character within said virtual three-dimensional space area which is for displaying three-dimensional characters, in accordance with the operations which are inputted by a user through said input means.

11. A character generating method, comprising the steps of:

inputting desired characters by manipulating an input means having a plurality of keys each associated with a respective character such that each character is inputted by actuating a respective key of the input means;

transforming when plural kinds of characters are designated through said input means, the designated plural kinds of characters respectively into three-dimensional forms within a virtual three-dimensional space area to generate three-dimensional characters by synthesizing face data, edge data and shadow data based on outline data corresponding to input characters such that said input characters look three-dimensional when viewed, projecting the three-dimensional characters individually and independently on a display screen of display means;

wherein each inputted character is viewable on the display screen so as to look three-dimensional when a user actuates only the single respective key associated with the respective character one time without actuating any other keys or functions thereafter; and simultaneously controlling a plurality of pages and layers containing edited and/or unedited characters and images.

12. The character generating method according to claim 11, wherein said three-dimensional character is moved within said virtual three-dimensional space area which is for displaying three-dimensional characters, in accordance with the operations inputted by a user through said input means.

13. An object generator for generating an object signal, comprising:

means for inputting a plurality of objects by manipulating an input device having a plurality of keys each associated with a respective character such that each object is inputted by actuating a respective key of the input device;

means for forming a three-dimensional image or images corresponding to said inputted objects by synthesizing face data, edge data and shadow data based on outline data corresponding to the inputted objects so as to generate said object signal such that said inputted objects look three-dimensional when viewed;

wherein each inputted object is viewable on a screen so as to look three-dimensional when a user actuates only the single respective key associated with the respective character one time without actuating any other keys or functions thereafter; and means for simultaneously controlling a plurality of pages and layers containing edited and/or unedited objects and images.

14. An object generating method for generating an object signal, comprising the steps of:

inputting a plurality of objects by manipulating an input device having a plurality of keys each associated with a respective character such that each object is inputted by actuating a respective key of the input device;

forming a three-dimensional image or images corresponding to said inputted objects by synthesizing face data, edge data and shadow data based on outline data corresponding to the inputted objects so as to generate said object signal such that said inputted objects look three-dimensional when viewed;

wherein each inputted object is viewable on a screen so as to look three-dimensional when a user actuates only the single respective key associated with the respective character one time without actuating any other keys or functions thereafter; and simultaneously controlling a plurality of pages and layers containing edited and/or unedited objects and images.

15. An object generator for generating an object signal, comprising:

means for inputting desired objects by manipulating an input device having a plurality of keys each associated with a respective character such that each object is inputted by actuating a respective key of the input device;

means for generating a polygon model or models corresponding to said inputted objects;

means for performing processing on said polygon model or models, said processing including synthesizing face data, edge data and shadow data based on outline data corresponding to said inputted objects so as to generate said object signal such that said inputted objects look like three-dimensional images when viewed;

wherein each inputted object is viewable on a screen so as to look three-dimensional when a user actuates only the single respective key associated with the respective character one time without actuating any other keys or functions thereafter; and means for simultaneously controlling a plurality of pages and layers containing edited and/or unedited objects and images.

16. An object generating method for generating an object signal, comprising the steps of:

inputting desired objects by manipulating an input device having a plurality of keys each associated with a respective character such that each object is inputted by actuating a respective key of the input device, generating a polygon model or models corresponding to said inputted objects;

performing processing on said polygon model or models, said processing including synthesizing face data, edge data and shadow data based on outline data corresponding to said inputted objects so as to generate said object signal such that said inputted objects look like three-dimensional images when viewed;

wherein each inputted object is viewable on a screen so as to look three-dimensional when a user actuates only the single respective key associated with the respective character one time without actuating any other keys or functions thereafter; and simultaneously controlling a plurality of pages and layers containing edited and/or unedited objects and images.

* * * * *